(12) United States Patent
Wang et al.

(10) Patent No.: US 11,544,933 B2
(45) Date of Patent: Jan. 3, 2023

(54) SMART READER SYSTEM

(71) Applicants: Lishao Wang, Halifax (CA); Shiwei Liu, Halifax (CA); Zibo Wang, Zhuhai (CN)

(72) Inventors: Lishao Wang, Halifax (CA); Shiwei Liu, Halifax (CA); Zibo Wang, Zhuhai (CN)

( * ) Notice: Subject to any disclaimer, the term of this patent is extended or adjusted under 35 U.S.C. 154(b) by 0 days.

(21) Appl. No.: 17/246,608

(22) Filed: May 1, 2021

(65) Prior Publication Data

US 2021/0342596 A1   Nov. 4, 2021

Related U.S. Application Data

(60) Provisional application No. 63/019,359, filed on May 3, 2020.

(51) Int. Cl.
*G06V 20/52* (2022.01)
*G06K 9/62* (2022.01)
*G01G 19/50* (2006.01)
*G01G 23/36* (2006.01)
*H04N 7/18* (2006.01)

(52) U.S. Cl.
CPC ............ *G06V 20/52* (2022.01); *G01G 19/50* (2013.01); *G01G 23/361* (2013.01); *G06K 9/6217* (2013.01); *H04N 7/185* (2013.01); *G06V 2201/02* (2022.01)

(58) Field of Classification Search
CPC .............................. G01G 19/50; G06V 20/52
See application file for complete search history.

(56) References Cited

U.S. PATENT DOCUMENTS

| 2016/0119593 | A1* | 4/2016 | Schultz | H04N 5/2251 348/77 |
| 2017/0323162 | A1* | 11/2017 | Jones | H04N 7/183 |
| 2019/0075756 | A1* | 3/2019 | Albornoz | A01K 11/006 |
| 2019/0130720 | A1* | 5/2019 | Lui | G08B 21/0407 |
| 2019/0340440 | A1* | 11/2019 | Atwater | A01K 61/13 |
| 2021/0201065 | A1* | 7/2021 | Miyake | G06V 10/23 |

* cited by examiner

*Primary Examiner* — Jerry T Jean Baptiste

(57) ABSTRACT

A smart reader system for a scale having a display is disclosed. The smart reader system includes an image capture device for capturing an image of the display; and an attachment device for mounting on the scale, the attachment device configured to receive the image capture device; and a computing device configured to identify, using a machine learning model, a weight from the image of the display.

19 Claims, 18 Drawing Sheets

| ID | time | weight |
|---|---|---|
| 001 | t1 | w2 |
| 002 | t7 | w1 |

| ID | time | weight | Name | note |
|---|---|---|---|---|
| 001 | t1 | 10.1 pounds | lobster | "put in the first storage room" |
| 002 | t7 | 6.2 pounds | lobster | ⋮ |

⇔

| ID | time | weight | Name | note |
|---|---|---|---|---|
| 001 | t1 | 4.58 kg | lobster | "put in the first storage room" |
| 002 | t7 | 2.81 kg | lobster | ⋮ |

FIG. 5

SMART READER SYSTEM

TECHNICAL FIELD

The present invention relates generally to computer vision, image analysis, and data handling. More specifically, the present invention relates to identifying, digesting and processing data that is visually displayed.

BACKGROUND

The United States and Canada are substantial seafood exporters in the world. During the fishing, processing, and transportation of seafood, weighing is an essential part of the industry. However, the traditional way of weighing seafood consumes significant manpower and is prone to errors.

SUMMARY

According to an aspect, there is provided a smart reader system for a scale having a display, comprising: an image capture device for capturing an image of the display; and an attachment device for mounting on the scale, the attachment device configured to receive the image capture device; and a computing device configured to identify, using a machine learning model, a weight from the image of the display.

According to another aspect, the image capture device and the display are substantially at a same level and have a distance of 5 cm-25 cm.

According to another aspect, the distance is about 15 cm.

According to another aspect, the computing device is configured to, using the machine learning model, to adjust a position of the image capture device by adjusting the attachment device.

According to another aspect, the image capture device to capture display at a specified portion of the image.

According to another aspect, the attachment device comprises a clamp for securely mounted to the display, and an adjustable arm with a first end movably extended from the clamp, and a second end secured to the image capture device.

According to another aspect, the attachment device comprises a first clamp for securely mounted to the display, and a second clamp for receiving the image capture device.

According to another aspect, the system further comprises a second display for displaying the weight identified by the computing device.

According to another aspect, the second display is a tablet display.

According to another aspect, the image capture device is at an opposite side of the tablet display.

According to another aspect, the computing device is at a tablet.

According to another aspect, the computing device is a cloud device or a remote device.

According to another aspect, the system further comprises a storage device for storing the images and the weight.

According to another aspect, the image capture device is an IP camera.

According to another aspect, the computing device is configured to determine variation of data on the display.

According to another aspect, the computing device is configured to adjust the read data in response to stability of the data.

According to another aspect, the computing device is further configured to aggregate data from multiple readings from the display.

According to another aspect, the computing device is configured to provide the aggregated data to a client device over a communications network.

According to another aspect, the computing device is configured to provide a chart comprising multiple weights.

According to another aspect, the computing device is configured to convert the weight to a desired unit.

BRIEF DESCRIPTION OF THE DRAWINGS

Various ones of the appended drawings merely illustrate example embodiments of the present disclosure and cannot be considered as limiting its scope.

FIG. 5 is a chart depicting one example embodiment of unit conversion.

DESCRIPTION

Figure 1:
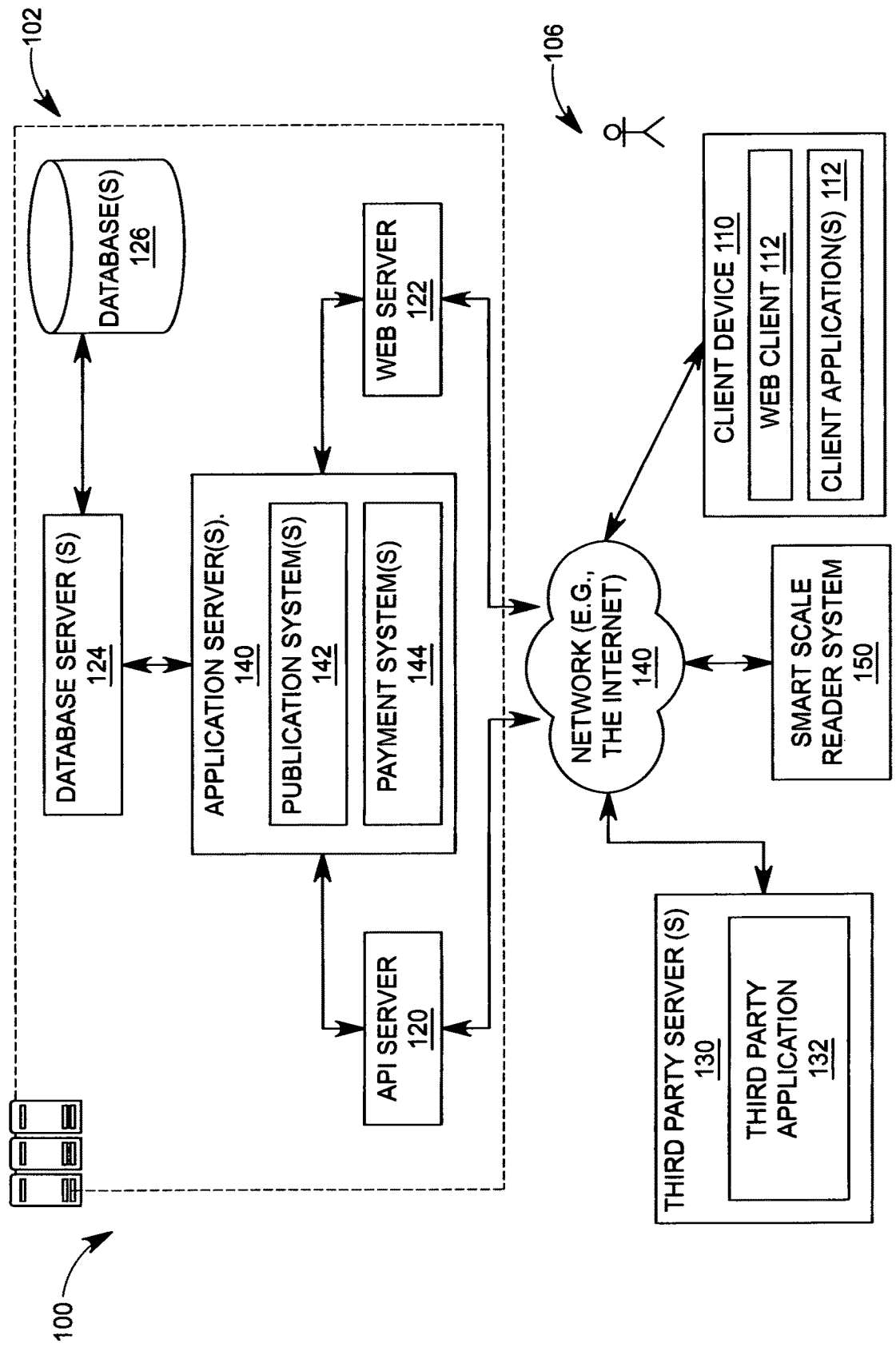
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in complete detail.

In various exemplary embodiments, the present invention introduces some specific technologies in the field of computer vision and data consumption. These technologies combined with electronic/mechanical devices make a product that helps read and record data that is visually displayed on the display of a scale, or any other device.

Intelligently reading the value of the scale may be used in the fishery industry (government, fishermen, seafood processing plants, etc.). At present, the scales used in the fishery industry may be 7-segment LED digital reading electronic scales. Under the premise of not replacing the scales, the electronic scale values may be read in real-time and accurately by loading a piece of external intelligent equipment alongside with the scale, and the values may be provided to a third application through an electronic interface.

As discussed herein, these technologies may apply to any type of data that is displayed visually. In one example, data displayed visually includes characters displayed on a 7-segment LED digital readout. In another example, visually displayed data is a numerical value displayed on an array of LED readouts (e.g., one number for each 7 segment LED). In another example, data is visually displayed via an electronic display constructed by a software application. For example, on the monitor of a computing system. Other examples include televisions, computer screens, tablet computers, cellular devices, watches, or any other electronic systems capable of visually displaying information.

In one specific embodiment, the implementation of the present invention during the fishing of lobster can limit reading and writing errors while operating with the scale. Bad weather condition may mostly cause this error. For example, sometimes a user can't read from the scale clearly when the scale display is reflective or backlighting. Or sometimes, a user need to yell to other a user to let them know the current reading of the scale, but the other a user may not hear clearly if the weather is windy. The integration of the computer vision techniques and our data processing format of the present disclosure simply and effectively address these problems. This embodiment will be further described herein.

In another specific embodiment, the implementation of the present invention during the boxing of lobsters can help a user removing extra steps while operating with the scale. For example, the factory doesn't need to waste manpower on weighing each lobster during the division of the lobster, and their corresponding boxes after the division of the lobster anymore. This process may be done by using our invention cooperating with a third-party automated system. This embodiment will be further described herein. For example, a label printing system can be integrated into the smart reader system to automatically print a label for the lobster according to the weight of the lobster.

In another example embodiment, the smart reader system monitors weight of lobster to be placed in a box. The smart reader system, in one example embodiment, combines the weight of the lobsters, and prints a label for the box before the lobsters arrive in the box.

In a further specific embodiment, the smart reader system can be used in other industries that require real-time scale reading, such as meat production, mineral transportation, etc. Not just limit in the fishery industry. Furthermore, the smart reader system can be configured to consume and process data that is visually displayed via any electronic device. Visually displayed data may include, analog displays, digital displays, screen displays, or the like. For example, the smart reader system may be configured to read the display of a scale.

Using computer vision and image analysis to read the data on the scale and record, process, and transmit the data electronically. Still more particularly, embodiments of the present invention as applied to help reduce the reading and writing errors, and increase their efficiency by removing extra steps while operating with the scale. Other comparable uses are also contemplated herein, as will be obvious one of ordinary skill in the art.

Let's take the example of the fishing, boxing, and transport of lobster. When fisherman finish processing lobster, they typically need to weigh each lobster and record their weight by reading the digital number from the scale and using a pencil to write the corresponding number down to a piece of paper. When the fisherman sells the lobster to the middleman, the middleman needs to do the same procedure again.

And then, it comes to the boxing of the lobster. While boxing, the middleman needs to divide lobsters into different types by their weight. And the middleman needs to weigh and record each lobster one more time. The reason that there is not a good idea to use the previous record data is the lobster may lose their weight during the storage. After the division, the middleman needs to put each type of lobster into their corresponding boxes. And each box needs to meet a certain amount of weight to ship. This step requires a user to keep their eyes on the screen of the scale while adding the lobster into the box until the box reaches the required amount of weight.

In one example embodiment, the smart reader system solves this problem by reading the display of the scale and audibly notify the middleman when an appropriate amount of lobster has been added to the box. This significantly speeds up the packaging process because the middleman does not need to visually monitor the display while packing the box, but can wait for the smart reader system to notify him. In one example, the notification is an audible beep. In another example, the notification is a light, or other event that makes the middleman aware that the appropriate amount of lobster has been reached.

When the lobster ship to the final person, the final person needs to weigh and record the weight of lobster one more time. Every time a user weigh and record the weight using the traditional way, as we described above, read by eye and write by hand, it is error prone and quite manpower consuming. Integrating the smart reader system into this industry will save much processing time and improve accuracy of associated data. Furthermore, after digitizing the various weights read by the smart reader systems, the smart reader system can generate more accurate reporting and determine areas where weight is lost.

In various example embodiments, a scale is operating with goods and visually displays the current weight of goods. A smart reader system, as described herein, is configured to use several computer vision techniques described herein to recognize the scale display reading, and analyze and organize the reading, and provide aggregated the result to a user.

In one example embodiment, the smart reader system records a video of visually displayed data and tracks pixels that change in frames of the video. In this example, by applying change detection algorithms, the smart reader systems determines which pixels of the image are associated with visually displayed data. For example, in a segment of a LED display the changed pixels may correlate with the segments of the LED display. The smart reader systems may then map LED segments being displayed with pixels in captured video and then determine the displayed value based on the pixel values in the associated captured image (e.g., frame of the video).

In one example embodiment, the result of this system is a real-time scale display reading indicates the current weight of the goods. In one example embodiment, the result of this system is a formatted chart uses time as an independent variable and uses the weight of the goods as a dependent variable. In another example embodiment, the result of this system is a formatted chart uses one column to store the time when the goods been weighed, uses another column to store the weight of the goods, and uses the other columns to store other information like the notes, the description of the goods, etc. In further example embodiments, the result of this system may be any data format that can store the scale display reading as one skilled in the art may appreciate.

In one example embodiment, the user of a smart reader system is a third party server or a third party application. In another example embodiment, the user of this system is a person operating with the scale in front of this system. In another example embodiment, the user of this system is a person that is using a client device accessing this system via a network.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a web browser, such as the Internet Explorer® browser developed by Microsoft® Corporation of Redmond, Washington State) and a client application(s) 114 executing on the client device 110.

The client device 110 may comprise, but is not limited to, a mobile phone, desktop computer, laptop, portable digital assistant (PDAs), smartphone, tablet, ultrabook, netbook, laptop, multi-processor system, microprocessor-based or programmable consumer electronics, game console, set-top box, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screen, accelerometer, gyroscope, cameras, microphone, global positioning system (GPS) device, and so forth.

One or more users 106 may be a person, a machine, or other means of interacting with the client device 110 or the smart reader system 150. In embodiments, the user 106 is not part of the network architecture 100 but may interact with the network architecture 100 via the client device 110 or another means. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications (also referred to as "apps") such as, but not limited to, a web browser, messaging application, electronic mail (email) application, an e-commerce site application (also referred to as a marketplace application), and the like. In some embodiments, if the smart reader system is included in a given client device 110, then this application is configured to locally provide the user interface, and at least some of the functionalities with the application configured to communicate with the networked system 102, on an as-needed basis, for data and/or processing capabilities not locally available (e.g., access to a database of items available for sale, to authenticate a user, to verify a method of payment, etc.).

One or more users 106 may be a person, a machine, or other means of interacting with the client device 110 or the smart reader system 150. In one example embodiment, the user 106 is not part of the network architecture 100 but may interact with the network architecture 100 via the client device 110 or other means. For instance, the user 106 provides input (e.g., touch screen input or alphanumeric input) to the client device 110, and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application server(s) 140. The application server(s) 140 may host one or more publication system 142 and payment system 144, each of which may comprise one or more modules or applications and each of which may be embodied as hardware, software, firmware, or any combination thereof. The application server(s) 140 are, in turn, shown to be coupled to one or more database servers 124 that facilitate access to one or more information storage repositories or database(s) 126. In an example embodiment, the database(s) 126 are storage devices that store information to be posted (e.g., publications or listings) to the publication system(s) 142. The database(s) 126 may also store digital item information in accordance with example embodiments.

Additionally, a third-party application 132, executing on third party server(s) 130, is shown as having programmatic access to the networked system 102 via the programmatic interface provided by the API server 120. For example, the third-party application 132, utilizing information retrieved from the networked system 102, supports one or more features or functions on a website hosted by the third party. The third-party website, for example, provides one or more promotional, the marketplace, or payment functions that are supported by the relevant applications of the networked system 102.

The publication system(s) 142 may provide a number of publication functions and services to users 106 that access the networked system 102. The payment system(s) 144 may likewise provide a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some embodiments, the payment system(s) 144 may form part of the publication system(s) 142.

The smart reader system 150 provides functionality operable to determine the current scale display reading and analyze and organize the reading as will be described later.

Further, while the client-server-based network architecture 100 shown in FIG. 1 employs a client-server architecture, the present inventive subject matter is of course not limited to such an architecture, and may equally well find application in a distributed, or peer-to-peer, architecture system, for example. The various publication system(s) 142, payment system(s) 144, and smart reader system 150 can also be implemented as standalone software programs, which do not necessarily have networking capabilities.

The web client 112 may access the various publication and payment systems 142 and 144 via the web interface supported by the web server 122. Similarly, the smart reader system 150 may communicate with the networked system 102 via a programmatic client. The programmatic client accesses the various services and functions provided by the publication and payment systems 142 and 144 via the programmatic interface provided by the API server 120.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, the marketplace, or payment functions that are supported by the relevant applications of the networked system 102.

Figure 2:
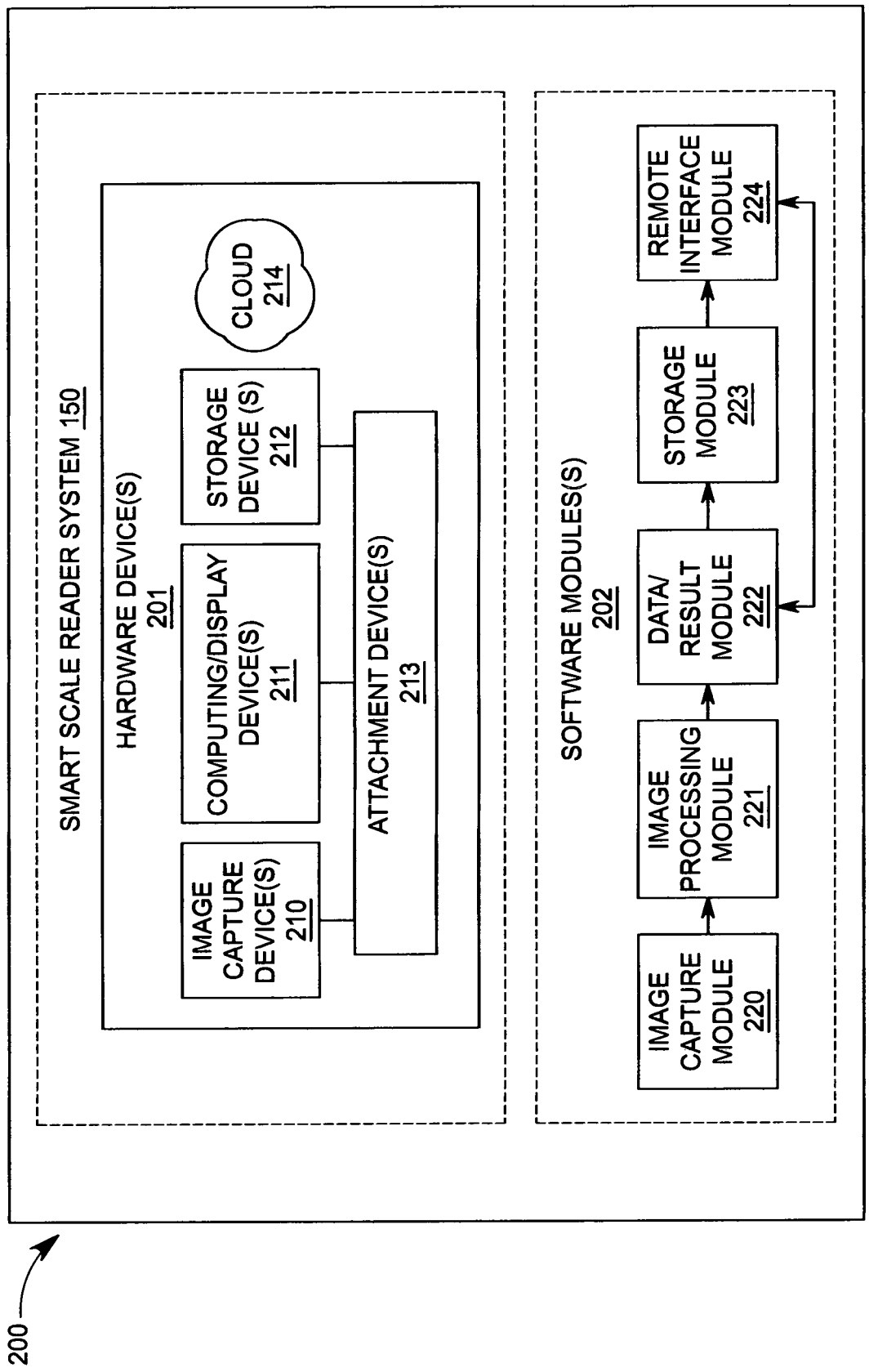
FIG. 2 is a block diagram illustrating the hardware device(s) and software module(s) of one example embodiment of the smart reader system.

FIG. 2 is a block diagram 200 illustrating the hardware device(s) 201 and software module(s) 202 of the smart reader system 150.

The hardware device(s) 201 of the smart reader system 150 may include an image capture device(s) 210, a computing/display device(s) 211, a storage device(s) 212, an attachment device(s) 213, and the cloud 214. Or a reasonable combination of the above device(s) that provides the environment allows the software modules 202 of the smart reader system 150 running or executing smoothly. The above hardware device(s) 201 may attach to each other physically in order to send or receive data, or placed at different places and use a network to send or receive data.

The image capture device(s) 210 may comprise, but is not limited to, a camera, an IP camera, a mobile phone, desktop computer, laptop, portable digital assistant (PDAs), smartphone, tablet, ultrabook, netbook, laptop, a multi-processor system, microprocessor-based or programmable consumer electronics, game console, or any other device that a user may utilize to capture an image and process it digitally. In some embodiments, the image capture device(s) may comprise a display module (not shown) to display information (e.g., in the form of user interfaces). In some embodiments, the image capture device(s) may comprise a CPU or GPU that is capable of performing some certain computer vision algorithms. In some embodiments, the image capture device(s) may be any other communication device that a user may utilize to access the networked system. In one embodiment, the computer vision algorithm is a neural network trained for image recognition.

The computing/display device(s) 211 may comprise, but is not limited to, a mobile phone, desktop computer, laptop, portable digital assistant (PDAs), smartphone, tablet, ultrabook, netbook, laptop, multi-processor system, microprocessor-based or programmable consumer electronics, game console, set-top box, or any other communication device that a user may utilize to access the networked system, perform some certain computer vision algorithms and may or may not contain a display. In some embodiments, the computing/display device(s) may comprise a display module (not shown) to display information (e.g., in the form of user interfaces). In further embodiments, the computing/display device(s) may comprise one or more of a touch screen, accelerometer, gyroscope, cameras, microphone, global positioning system (GPS) device, and so forth. The computing/display device(s) may be a device of a user that is used to perform a transaction involving digital items within the networked system. In one embodiment, the networked system is a network-based marketplace that responds to requests for product listings, publishes publications comprising item listings of products available on the network-based marketplace, and manages payments for these marketplace transactions. In one embodiment, the computer vision algorithm is a neural network trained for image recognition. In some examples, the computing device 211, such as a processor of a tablet, may be integrated with the image capture device, such as the camera of the tablet.

The storage device(s) 212 may comprise, but is not limited to, a non-transitory memory, a jump drive, a SIM card, a micro SD card, a disk, a hard drive, a mobile phone, desktop computer, laptop, portable digital assistant (PDAs), smartphone, tablet, ultrabook, netbook, laptop, a multi-processor system, microprocessor-based or programmable consumer electronics, game console, or any other device that a user may utilize to store the data electronically. In some examples, the storage device 212 may be integrated with the image capture device, such as the memory and camera of a tablet.

The attachment device(s) 213 may comprise, but is not limited to the adjustable arms, the adjustable necks, clamps, shaped metal or plastic, or any other device that a user may utilize to hold the computing/display device(s), the image capture device(s) and the storage device(s) and adjust the relative position between the above devices. Of course, one skilled in the art may recognize other ways to position the image capture device such that captured images include visually displayed data and this disclosure is meant to include all such ways.

In another example embodiment, the attachment device 213 is configured to automatically adjust the image capture device For example, in response to the image capture device not being capable of viewing all of the visually displayed data, the image capture device may command the attachment devices 213, which may be the adjustable arms to be described in detail below, to adjust the image capture device. A pre-trained AI/ML model is configured to recognize the display of a scale. If the display of a scale is not completely detected in the captured image, the AI/ML model may instruct the attachment devices 213 to adjust its position so that the image capture device can capture all of the visually displayed data on the scale. The attachment device 213 may include circuit electrically connected with the image capture device 210, and one or more actuators for adjusting the arms of the attachment devices 213. The instructions from the image capture device 210 actuate the actuators, which in turn adjusting the attachment device 213. As such, the positon of the image capturing device 210 mounted on the attachment device 213 is adjusted accordingly. The one or more actuators For example, if the captured images are missing some of the visually displayed data to the left of the image, the pre-trained AI/ML model in a computing device 211 device may command the attachment device to move to the left so that all of the visually displayed data is captured in the images. In some examples, the AI/ML model may be in the image capture device 210. In another example, if a portion of the scale display is not detected in the image, such as the left half of the scale display, the AI/ML model in the computing device is trained to recognize that the captured images are missing some of the visually displayed data to the left of the image. The AI/ML model in the computing device may be configured to cause the attachment devices to adjust the position of the image capture device to the extent that the entire scale display is detected in the image, and the scale display occupies a desired portion of the entire captured image, such as 20% to 100% of the entire image.

In some examples, computing device 211 can be configured to, using artificial intelligence and machine learning model, recognize the weight value displayed on scale display. For example, a machine learning model can be implemented by a neural network running on a computing platform such as computing device 211. Neural networks will be briefly described in general terms. A neural network can include multiple layers of neurons, each neuron receiving inputs from a previous layer, applying a set of weights to the inputs, and combining these weighted inputs to generate an output, which can in turn be provided as input to one or more neurons of a subsequent layer.

A layer of neurons uses filters to define the relationship between the outputs of the neurons of the previous layer and the outputs of the neurons of the current layer. A layer of the neural network receives a data input, usually in the form of a data array of known dimensions. By applying the set of filters (layers) to the data input, such as the measurement data input, each layer generates a data output, which is typically a data array having known dimensions. A filter comprises a set of weights (also called parameters).

The machine learning model is trained to infer the weight value displayed on scale display and to adjust the attachment devices 213. In the example of a neural network, training a neural network involves learning or determining the appropriate weight values at different weight locations throughout the network. After being optimally trained to perform a given inference task, the weights of the neural network will not all contribute equally to the final inference outputs: some weights will have high value due to their high contribution, while other weights will have low value due to their low contribution. If the weights are not properly trained (e.g., high value weights are misplaced or miscalibrated by training), then the trained network will perform with less accuracy. In identifying a fire hazard, the machine learning model can be trained by a suitable set of training data, such as images of the scale display, to determine appropriate weights. The training data may include a labeled set of inputs that can be based on simulated or actual scenarios. The trained machine learning model can be used to create and apply models for performing the inference tasks such as the weight displayed on the scale display. In some examples, the trained machine learning model includes a support vector machine (SVM) or linear regression.

In one example embodiment, the smart reader system automatically adjusts the position of the attachment device to ensure that the captured images include the entire display. In another example, the smart reader system automatically adjusts the position of the attachment device to ensure that the captured images include relevant parts of the display. In another example, the smart reader system automatically adjusts the attachment device to capture a most prominent feature of the display (e.g., a single displayed value, a largest value, a most centered value, or the like). For example, the smart reader system keeps adjusting the image capture device until a most prominent feature of the display is captured.

In another example embodiment, the smart reader system adjusts the attachment device so that the display occupies a specified portion of the image. For example, the specified portion of the image may be determined by the pixels. In certain embodiments, the specified portion of the display is between 20% and 100%. For example, if the entire image has 10000 pixels, the scale display may occupy 2000 to 10000 pixels of the image.

In another example embodiment, the smart reader system presents or transmits a notification to a user in response to the smart reader system not being able to adjust the attachment device to capture the indicated values, for example, when the adjustment device is are stuck or broken or has reached its adjustment limit.

In another example embodiment, the smart reader system indicates to the user in which direction to adjust the attachment device.

In response to the image containing the scale display, but the scale of the display to the entire image is below 20 percent. For example, if the entire image has 10000 pixels, the scale display has less than 2000 pixels in the image the scale of the display to the entire image is below 20 percent. This generally indicates that the distance between the image capture device and the display is too far, the smart reader system indicates to the user to move the image capture device closer to the display until the display occupies at least 20% of the image.

In response to the image containing the display, but the display is not completely displayed by the image, which may indicate that the distance between the image capture device and the display is too small, the smart reader system notifies the user to move the image capture device further away from the display.

In response to the image containing the scale display, but some parts of the scale display are missing, the algorithm outputs a low confident reading at the edge of the image where parts of the scale display are missing and triggers an automatic adjusting procedure until the new incoming image contains the entire scale display. For example, in response to the image capture device not being capable of viewing all of the visually displayed data, the algorithm may command the attachment devices to adjust the image capture device. For example, if the captured images are missing some of the visually displayed data to the left of the image, the algorithm may command the attachment device to move to the left so that all of the visually displayed data is captured in the images.

In certain embodiments, the set of instructions that implement various adjustment algorithms are part of the image capture device. Of course, this is not necessarily the case as computer processors that implement the algorithms, including the AI/ML model, described herein may be included in any portion of the smart reader system, as one skilled in the art may appreciate Cloud 214 refers to a group of computers that allow a user to store and to access data and programs over the network instead of the local computer's hard drive, such as images captured by the image capture device 210, the weight identified by the computing device 211, and applications such as AI/ML models.

The software module(s) 202 of the smart reader system 150 includes an image capture module 220, an image processing module 221, a data/result module 222, a storage module 223, and a remote interface module 224. The software module(s) 202 of the smart reader system 150 can also include some other reasonable module(s), use a reasonable combination of the module(s), or use another reasonable data flow logic that performs a similar functionality as will be further described.

The image capture module 220 is to capture an image or a video digitally that may contain the output of a scale or other display. In one example embodiment, the image capture module 220 may capture a single image. In another example embodiment, the image capture module 220 may capture a video that contains a series of images. The image capture module 220 may be hosted by an image capture device 210, by a computing/display device 211 or some other device that can capture an image or a video digitally. Of course, one skilled in the art may recognize other ways in which the image capture module 220 may capture an image or a video, and this disclosure is not limited in this regard.

If the image processing module 221 and the image capture module 220 are hosted by the different devices, the image processing module 221 may receive the result from the image capture module 220 by a network(e.g., the internet) or by a data transmission line(e.g., a USB cable). If the image processing module 221 and the image capture module 220 are hosted by the same device, the image processing module 221 may receive the result from the image capture module 220 by accessing the memory cash or the hard disk of that device. The result from the image capture module 220 may be a single image, may be a video that contains a series of images.

In one example embodiment, the image processing module 221 receives a single image that may contain the digital output of the scale display. In one example embodiment, if the image does contain the digital output of the scale display, the image processing module 221 applies a neural network trained for digital recognition and create a variable to store the data that shows up in the image and its corresponding timestamp, for example, in milliseconds. If the image does not contain the output of the scale display, the pre-trained neural network won't be able to identify any digital in the image so that this image would be skipped. If the image contains several outputs of the scale display, for example, the date, the current time, and the weight, the image processing module 221 only applies a neural network trained for digital recognition to recognize the largest digital output in size. In this example, for a scale display, the largest digital output should be the weight, and the date and the time should appear smaller than the weight. If the image contains the digital output of the scale display, but it is not very clear, for example, the scale display is reflective or backlighting. The applied trained neural network will figure out the number that most likely indicates the scale display output.

In another example embodiment, the image processing module 221 receives a video that contains a series of images. In this example embodiment, the image processing module 221 separates the video by all the frames it contains. After that, the image processing module 221 analyzes each frame as we described above.

Figure 6:
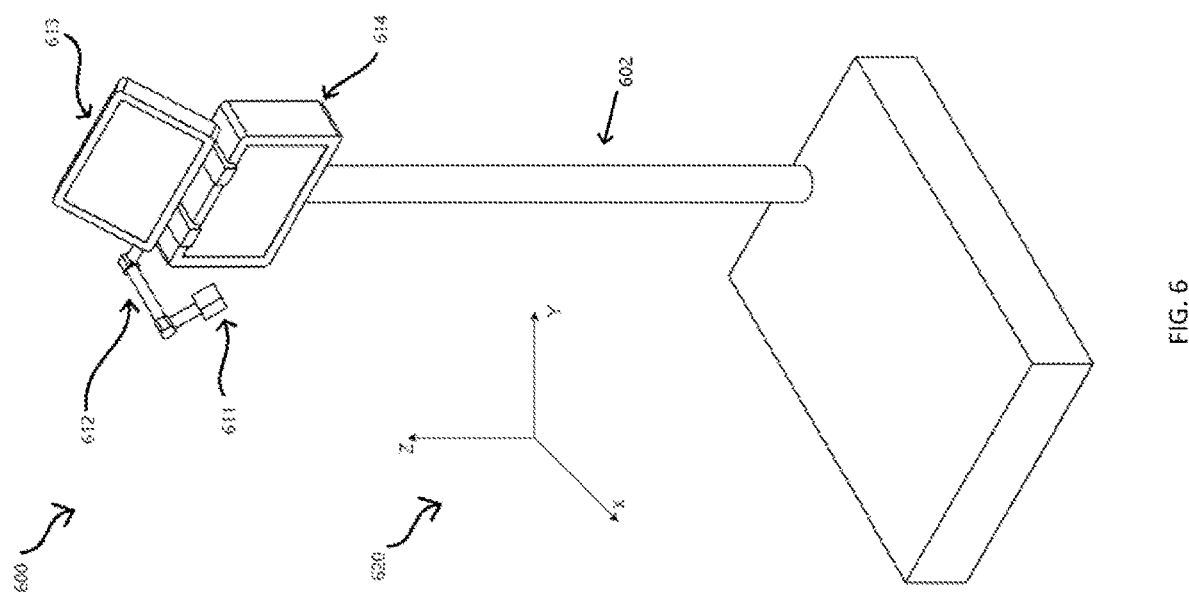
FIG. 6 is a diagram illustrating one of the possible solutions of the smart reader system.

In another example embodiment, the image processing module 221 receives an image or a video, but the image capture device is not set up correctly, for example, referring to FIG. 6, someone rotates the camera 611 that hosted the image capture module 220 by 90 degrees in YZ plane and rotates the adjustable arm 612 by 15 degrees in XY plane accidentally, in this situation, the image processing module 221 adjusts the image or the video, to make it looks just like the one that captured when the image capture device is properly. This problem can be solved by adjusting the attachment device(s) to set up the image capture device properly as well.

In the further example embodiment, the image processing module 221 may perform a pro-process method, for example, grayscale the image and resize the image to some certain size to adapt the pre-trained neural network. The image processing module 221 can also apply some other computer vision techniques to abstract the digital from an image, as one skilled in the art may appreciate.

The image processing module 221 may be hosted by an image capture device 210, a computing/display device 211, the cloud 214, or some other device that can perform the computer vision algorithm that extracts the digital from an image. Of course, one skilled in the art may recognize other ways in which the image processing module 221 may extract the digital from an image, and this disclosure is not limited in this regard. In one example, the image processing module 221 crops the image to include a portion of the image consistent with the training images used for the neural network.

If the data/result module 222 and the image processing module 221 are hosted by the different devices, the data/result module 222 may receive the result from the image processing module 221 by a network(e.g., the internet) or by a data transmission line(e.g., a USB cable). If the data/result module 222 and the image processing module 221 are hosted by the same device, the data/result module 222 may receive the result from the image processing module 221 by accessing the memory cash or the hard disk of that device. The result from the image processing module 221 is the variables that contain the digital output of the scale display and the timestamp, as we described above.

After the data/result module 222 receives those variables, it may (in one example embodiment) begin to analyze and organize those variables immediately.

In one example embodiment, a section of those variables contains a very similar timestamp but very different digital output, which means the output of the scale display was jumping at that time. This situation often occurs in 2 seconds when a user initially put the material on the scale, initially add the new material on the scale, or initially remove the material on the scale. After the scale display jumping, the scale display will remain at a constant reading. So the data/result module 222 analyzes this section of variables and the rest of the variables to determine the variables which contain the digital output recorded when the scale display remained at a constant reading. And the data/result module 222 marks those variables as "good" and mark the rest of the variables as "bad." In another example embodiment, the data/result module 222 records "good" data and deletes, removes or ignores other data points.

In some example embodiments, a short period of time indicates the time period less than a predetermined period, such as 2 seconds or less than 10 percent of the stable reading period. For example, if the worker initially put a lobster on the scale, and the weight of the lobster is 2.11 pounds. For the most scales, instead of display 2.11 pounds immediately, the scale will display some intermediate values first in 2 seconds (e.g., display 1.51 pounds, 1.98 pounds, 2.09 pounds) and then stable at 2.11 pounds. In this example, the data/result module 222 records the "good" data, which is the stable reading 2.11 pounds, and ignores the "bad" data, which are the intermediate values (e.g., 1.51 pounds, 1.98 pounds, 2.09 pounds.)

In another example, if there are two lobsters on the scale and the worker decides to remove one lobster, the remaining lobster weighs 1.98 pounds. This situation is similar to the one above. Most scales will display some intermediate values in 2 seconds and then display a stable value of 1.98 pounds. In this example, the data/result module 222 records the "good" data, which is the stable reading 1.98 pounds and ignores the "bad" data, which are the intermediate values.

In one example embodiment, some variables contains a similar timestamp, but a few of these variables contain slightly different digital output than the others while the rest of these variables contains the same digital output, which means there may be some external factors disturbing the scale operation at that time. For example, this may happen when someone applies pressure to the plate of the scale accidentally. Or the pressure may be applied by the climatic factors like the wind, the rain, etc. So the data/result module 222 analyzes this section of variables and the rest of the variables to determine which variable contains the digital output recorded when it was an accident. The data/result module 222 may mark those variables as "bad."

In one example embodiment, some scales reading does not remain at 0 when there is nothing on the scale. This may be caused by various reasons, including the plate of the scale is rusty, or the setting of the scale is incorrect, etc. In this example embodiment, the data/result module 222 analyzes all the input variables to determine the error reading when there is nothing on the scale plate and adjust the result by subtracting the error reading from the reading when there is something on the scale. For example, if the scale reading remains at 1 pound when there is no good on the scale, and then a user put the goods on the scale, and the scale display shows the current weight of the goods is 17 pounds. In this example, the data/result module 222 subtracts the error reading, which is 1 pound, from the reading when there are goods on the scale, which is 17 pounds, to provide a correct result, which is 16 pounds. In another example, if the minimum reading of the scale without carrying any weight is not 0, such as around 0 (0 to 1 pound) for a period of time, such as more than 15 operation hours, then the reading is an error.

In another example embodiment, after the analysis, the data/result module 222 begins to organize those variables and provide a result that can be shown on a digital display.

Figure 3:
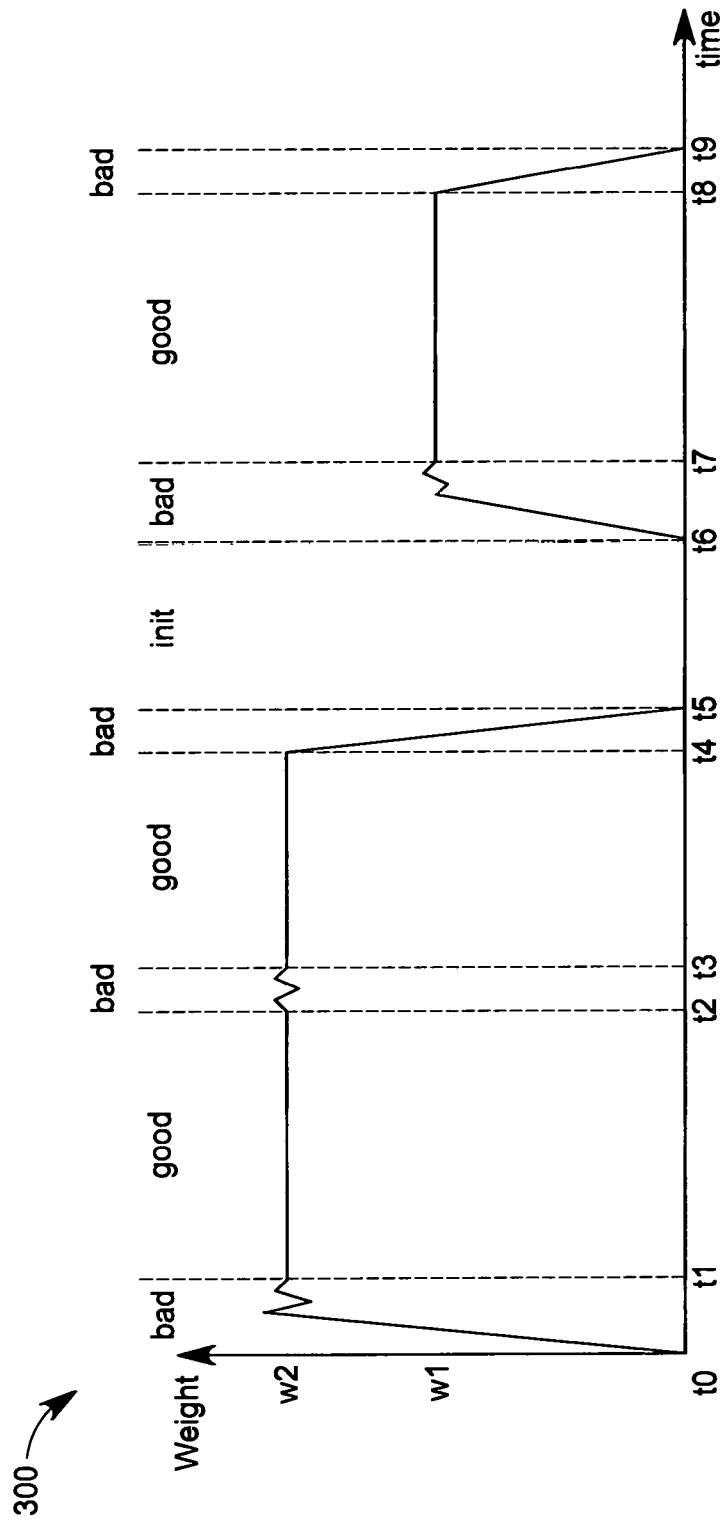
FIG. 3 is a chart depicting how the data/result module of the smart reader system may analyze the data, according to one example embodiment.

In one example embodiment, data/result module 222 provides a chart that indicates the time as an independent variable and the weight as a dependent variable and can be displayed on the computing/display device(s) like FIG. 3.

Figure 4:
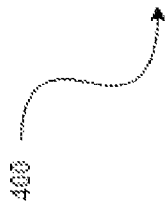
FIG. 4 is a chart depicting one of possible outputs according to one example embodiment.

In another example embodiment, data/result module 222 provides a chart that uses one column to store the ID of the goods, uses one column to store the time when the goods been weighed, and uses another column to store the weight of the goods like FIG. 4.

In a further example embodiment, the data/result module 222 not only provides the chart that displays the result as we described above but also provides an interface to allow users to adjust and modify the result. For example, a user of the scale can name the second row of FIG. 4 as "lobster," and adding a note as "put in the first storage room." For another example, a user can delete an entire row of FIG. 4 if they think that row is recorded by mistake.

In a further example embodiment, the data/result module 222 allow a user to switch or convert the current unit of measurement to any other desired unit of measurement, for example, a user can switch the "pound" to "kg" as FIG. 5 indicates.

The data/result module 222 may be hosted by an image capture device 210, a computing/display device 211, the cloud 214, or some other device that can perform the algorithm that can analyze and organize the data as previously described. If the host device of the data/result module 222 does not have a display(e.g., a device that doesn't have a screen) or does not have a method to interact with the data(e.g., a device that does have a screen but the screen is not touchable), a user can access and modify the result through the remote interface module 224 as will be described later. Of course, one skilled in the art may recognize other ways in which the data/result module 222 may analyze and organize the data, and this disclosure is not limited in this regard.

If the storage module 223, the data/result module 222, and the remote interface module 224 are hosted by the different devices, the storage module 223 may receive the data from the data/result module 222 and the remote interface module 224 by a network (e.g., the internet) or by a data transmission line (e.g., a USB cable). If the storage module 223, the data/result module 222, and the remote interface module 224 are hosted by the same device, the storage module 223 may receive the data from the data/result module 222 and the remote interface module 224 by accessing the memory cash or the hard disk of that device. The data from the data/result module 222 is the organized data as we described above, the data from the remote interface module 224 is, the most time, the instructions.

In one example embodiment, the storage module 223 stores the organized data from the data/result module 222 using the PDF or PNG format like FIG. 3. As one skilled in the art may appreciate, PNG (Portable Network Graphics) is a raster-graphics file-format that supports lossless data compression.

In another example embodiment, the storage module 223 stores the organized data from the data/result module 222 using a format that can be read by any industry standard spreadsheet program (e.g., Microsoft Excel) or CSV format like FIG. 4.

As one skilled in the art may appreciate, a CSV (comma-separated values) format is a delimited text format that uses a comma to separate values. Each line of the file in CSV format is a data record. Each record consists of one or more fields, separated by commas. The use of the comma as a field separator is the source of the name for this file format.

In a further example embodiment, the storage module 223 stores the video with subtitles describing the current scale display. In certain embodiments, subtitle indicates the displaying weight on the scale display. For example, if the scale display is displaying "20 pounds," the subtitle is "20 pounds," if the scale display is changing its output to "15 pounds", the subtitle changed to "15 pounds" as well. For the subtitle in this example embodiment, we use a condensed sans serif at 36 pt (like Swiss Condensed, Arial Narrow, Helvetica Condensed), with an edge as well as a slight drop shadow. The location of the subtitle is on the lower mid of the video, but may be placed anywhere on the electronic output as one skilled in the art may appreciate.

The storage module 223 may be hosted by an image capture device 210, a computing/display device 211, the cloud 214, the storage device 212, or some other devices that can store the data. Of course, one skilled in the art may recognize other ways in which the storage module 223 may store the data, and this disclosure is not limited in this regard.

If the remote interface module 224, storage module 223, and the data/result module 222 are hosted by the different devices, the remote interface module 224 may receive the data from the data/result module 222 and the storage module 223 by a network(e.g., the internet) or by a data transmission line(e.g., a USB cable). If the remote interface module 224, the storage module 223, and the data/result module 222 are hosted by the same device, the remote interface module 224 may receive the data from the data/result module 222 and the storage module 223 by accessing the memory cash or the hard disk of that device. The data from the data/result module 222 is the organized data as we described above, the data from the storage module 223 is the stored profile as we described above.

In one example, the remote interface module 224 uses a real-time communication protocol to provide real-time scale reading to a third-party server 130 or a third-party application 132 via a network(e.g., the internet) as one skilled in the art may appreciate.

In one example embodiment, a weight limit alarm system is tracking the reading of each scale to ensure the goods on the scale won't exceed 100 pounds, in this example embodiment, the remote interface module 224 keeps sending the real-time scale reading to the weight limit alarm system. Once the weight exceeds 100 pounds, the weight limit alarm system alerts the workers.

And also, the remote interface module 224 provides a user interface that allows a user using any type of client devices to access and modify the current result from the data/result module 222, and the stored files from the storage module 223 as we described above, as one skilled in the art may appreciate.

In one example embodiment, a user uses a mobile phone to access the remote interface module 224 via a network (e.g., the internet) as one skilled in the art may appreciate and modify the current result from the data/result module 222. For example, the user can name the second row of FIG. 4 as "lobster," and adding a note as "put in the first storage room." For another example, the user can delete an entire row of FIG. 4 if they think that row is recorded by mistake.

In another example embodiment, a user uses a tablet to access the remote interface module 224 via a network(e.g., the internet) as one skilled in the art may appreciate and view or modify the stored file from the storage module 223. For example, if the user wants to know how the scale operated yesterday (e.g., how many goods this scale weighed yesterday and what is the weight for each good), he/she can open and view the file stored by the storage module 223 that record that information. For another example, if the user thinks some files stored by the storage module 223 are not necessary anymore, he/she can simply delete them.

The remote interface module 224 may be hosted by the cloud 214, but it may be hosted by an image capture device 210, a computing/display device 211, a storage device 212, or some other devices that can be accessed by the client devices via a network(e.g., the internet) as well. Of course, one skilled in the art may recognize other ways in which the remote interface module 224 may provide an interface for a user, a third-party server 130, or a third-party application 132 to get required data, and this disclosure is not limited in this regard.

FIG. 3 is a chart 300 that indicates the time as an independent variable and the weight as a dependent variable generated by the data/result module 222 as one example embodiment. In this example embodiment, from time t0 to t1, the goods were initially put on the scale, so the scale display was jumping in this time period. For this situation, the data/result module 222 marks the scale reading as "bad" for this time period. Of course, other words may be used to indicate that the reading is not acceptable and this disclosure is not limited in this regard.

From time t1 to t2, the scale display remains at a constant reading. The data/result module 222 marks the scale reading as "good" for this time period. Of course, other words may be used to suggest that this reading is good or acceptable, and this disclosure is not limited in this regard.

From time t2 to t3, the scale display was jumping again. This may be caused by external factors that we described before. So the data/result module 222 marks the scale reading as "bad" for this time period.

In one example embodiment, in response to visually displayed data jumping, the smart reader system wait until the visually displayed data stops. For example, jumping may mean that the reading on the scale is changing more than 10% in a given period of time (e.g., 1 second).

In one example embodiment, an algorithm uses a calculus method to calculate the average scale display reading. Referring to FIG. 3, the average scale display reading is the total area under the curve divided by the total appearance time, so for this example, the average scale display reading=(the area under the curve from t0 to t5+the area under the curve from t6 to t9)/((t5-t0)+(t9-t6)). The average scale display reading helps determine whether the scale reading remains constant, and mitigate the errors. For example, if the average scale display reading is 50 pounds, and if the current scale display reading changing more than or equal to 5 pounds per second, the data/result module 222 determines those reading as "transitional," and marks those reading as "bad."

From time t3 to t4, the scale display remains at a constant reading. The data/result module 222 marks the scale reading as "good" for this time period.

In another example embodiment, "good" displayed data means the scale display reading less than 10% of the average scale display reading per second, "bad" refers to the scale display reading greater than or equal to 10% of the average scale display. In one example, the smart reader system waits for the displayed data to be stable for a predetermined period, such as at least 2 seconds. For example, if the scale display reading remains at 42 pounds for 2 seconds, the data/result module 222 determines this reading as "constant," and marks this reading as "good." The user can also customize this stable time by their own habits.

From time t4 to t5, the goods were initially removed on the scale, so the scale display was jumping in this time period. For this situation, the data/result module 222 marks the scale reading as "bad" for this time period.

From time t5 to t6, the goods were totally removed from the scale, so there is nothing left on the scale, and scale display remains at the initial value. For this situation, the data/result module 222 marks the scale reading as "init" for this time period.

In certain examples, the initial value means the value of the scale display reading while there is nothing on the scale. In this situation, the scale display reading may be 0. But if the scale is uncalibrated or something went wrong as we described above, the scale display reading may be some other number close to but not equal to 0. And also, the scale display may display nothing at all if there is nothing on the scale. The data/result module 222 determines what initial value of the scale is no matter which of the above situation happens. If the data/result module 222 recognizes one of the above initial value situations happens, the data/result module 222 may be prepared to analyze the next measurement.

From time t6 to t7, the other goods were initially put on the scale, so the scale display was jumping in this time period. For this situation, the data/result module 222 marks the scale reading as "bad" for this time period.

From time t7 to t8, the scale display remains at a constant reading. The data/result module 222 marks the scale reading as "good" for this time period.

From time t8 to t9, the goods were initially removed on the scale, so the scale display was jumping in this time period. For this situation, the data/result module 222 marks the scale reading as "bad" for this time period.

In this example embodiment described in the immediately preceding paragraphs and based on the above analysis and labels, the data/result module 222 assigns an ID as "001" for the goods been putting on the scale from time t0 to t5, use the time t1 and weight w2 to record its corresponding time and weight. Similarly, the data/result module 222 assigns an ID as "002" for the goods been putting on the scale from time t6 to t9, use the time t7 and weight w1 to record its corresponding time and weight. Finally, the data/result module 222 generates a new chart based on the ID, time, and weight as FIG. 4.

FIG. 4 is a chart 400 that uses one column to store the ID of the goods, uses one column to store the time when the goods been weighed, and uses another column to store the weight of the goods generated by the data/result module 222 as one example embodiment.

The data/result module 222 also allows user to modify or edit the chart 400. For example, a user can name the second row of FIG. 4 as "lobster," and adding a note as "put in the first storage room." For another example, a user can delete an entire row of FIG. 4 if they think that row is recorded by mistake, or for any other reason.

FIG. 5 is a chart 500 depicting the unit conversion. Chart 501 is stored in "pounds." Chart 502 is stored in "kg." The data/result module 222 also allows the user to switch the weight representation to any other common units of the weight measurement.

In other example embodiments, a common units of the weight measurement include, but not limited to, tons(t), kilograms(kg), grams(g), pounds(lb), ounces(oz), etc. And the data/result module 222 allows the user to switch between any of those common units of the weight measurement. For example, if the current goods weigh 10.1 pounds, the user can switch to use kilograms to represent the weight, which is 4.58 kg; the user can also switch to use grams to represent the weight, which is 4580 g; if the user decided to use ounces to represent the weight, it is 161.6 ounces; if the user decided to use tons to represent the weight, then it is 0.00505 ton.

FIG. 6 is a diagram 600 illustrating one of the embodiments of the smart scale system 150. Referring to FIG. 6, the system 150 may include a camera 611, one or more universal brackets for mounting the camera 611 to the scale, an adjustable neck 612 for adjusting the positon of the camera 611, and a tablet 613 mounted on scale display 614 via a rack 711. The Artificial intelligent/Machine Learning (AI/ML) model described above reads the values on the scale through the camera in real-time. Accurately and efficiently identify the current weight, and finally provide the re-read weight value to third-party applications. For example, in this embodiment, camera 611 is the image capture device 210, the tablet 613 is the computing device 211, the cloud 214 is not shown in this figure. Camera 611 is recording the scale display by using its image capture module 220 and sending the data to the image processing module 221, which may be hosted by camera 611 or the tablet 613. And then, the image processing module 221 sends its data to the data/result module 222, which can be accessed by the remote interface module 224. Finally, the data/result module 222 put its result to the storage module 223, which can be accessed by the remote interface module 224 as well. In this example, the data/result module 222 is hosted by tablet 613. The remote interface module 224 is hosted by cloud 214, and the storage module 223 could be hosted by tablet 613 or another storage device. The XYZ-coordinate plane 620 is also shown in FIG. 6.

Figure 7:
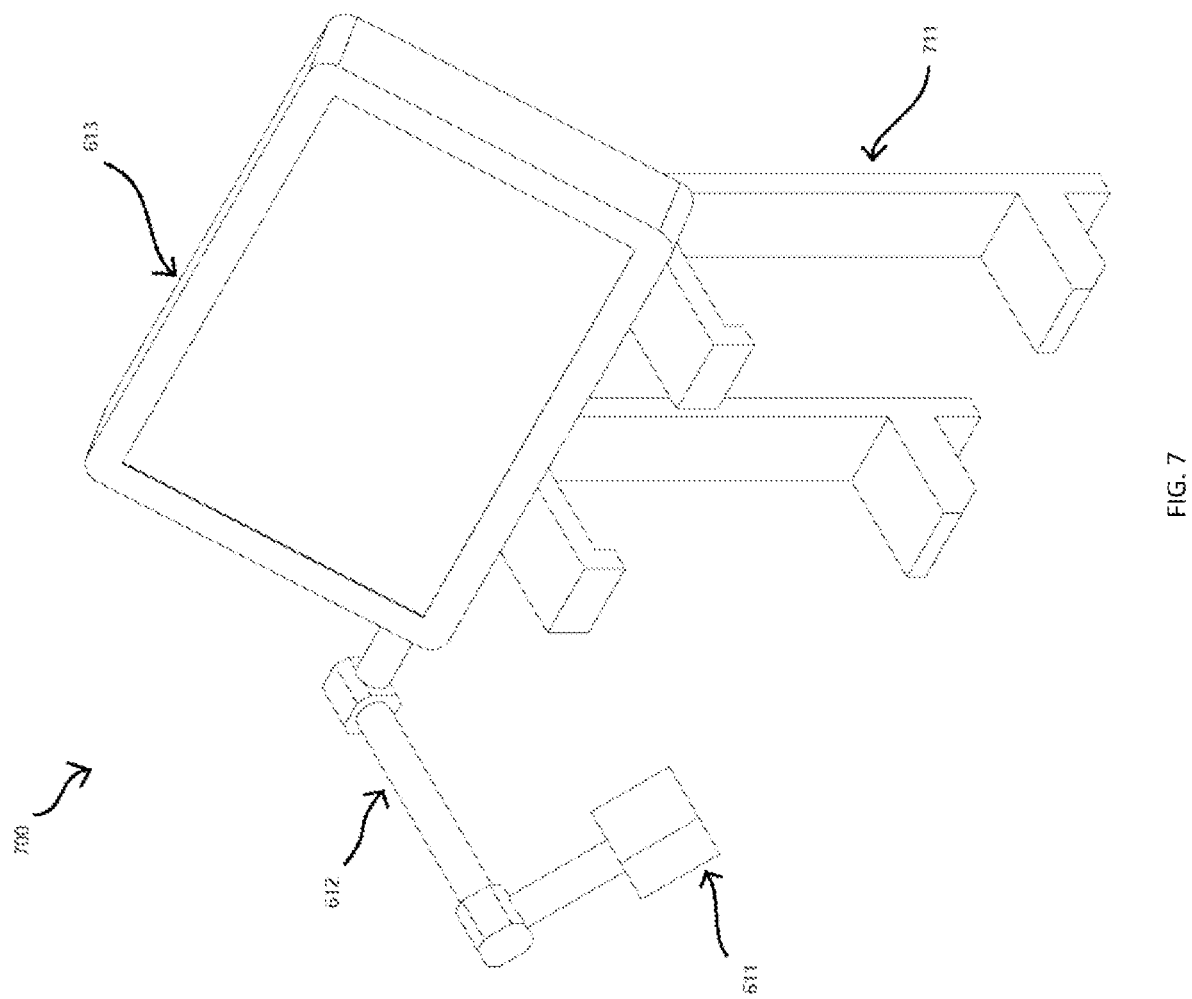
FIG. 7 is a close observation diagram of FIG. 6

FIG. 7 is an example of an enlarged view of a smart reading system 700 of the adjustable neck 612, the camera 611, the tablet 613 of FIG. 6, and a fastener 711 for fastening the adjustable neck 612, the camera 611, and the tablet 613 to the scale 602. Referring to Figure FIG. 7, in one example, the fastener 711 is a clamp 711 that has several different models in order to fix the different types of scales on the market, or other devices, Tablet 613 is attached to Clamp 711. In this example, the camera 611 is connected to the clamp 711 through an adjustable neck 612. Camera 611 can fully shoot the scale display at its proper working position (e.g., 15 cm), and can clearly display the numbers under complex conditions, such as low light, strong light, and reflective conditions. Since the distance between camera 611 and the scale display 613 is relevant small, and since the camera 611 and the scale display 613 are substantially at the same level, the complex conditions, such as low light, strong light, and reflective conditions, have little or no effect on camera 611 reading from the scale display 613. Adjustable Neck 612 can be used to adjust the relative position between Camera 611 and the scale display (which is not shown in this figure) to ensure the Camera 611 meets its proper working position.

In one example embodiment, a "proper working position" may be 5-25 cm, preferably 15 cm, between the display and the camera. Of course, other distances may be used depending on the capabilities of the camera and this disclosure is not limited in this regards. Generally, the scale display 613 and the image capture device 611 may be positioned in various manners as long as the scale display 613 can be detected from the image captured by the image capture device 611 and the portion is between 20% to 100%, In other examples, a proper working position is a high resolution camera that is far away (e.g., 10 meters or more) from the display, but is positioned to view the display.

In another example embodiment, the camera is placed to be able to view many displays from a far distance and the algorithms find the several displays the perform the algorithms described herein on each of the displays. Thus, in some embodiments, a single image may include several displays.

Figure 8:
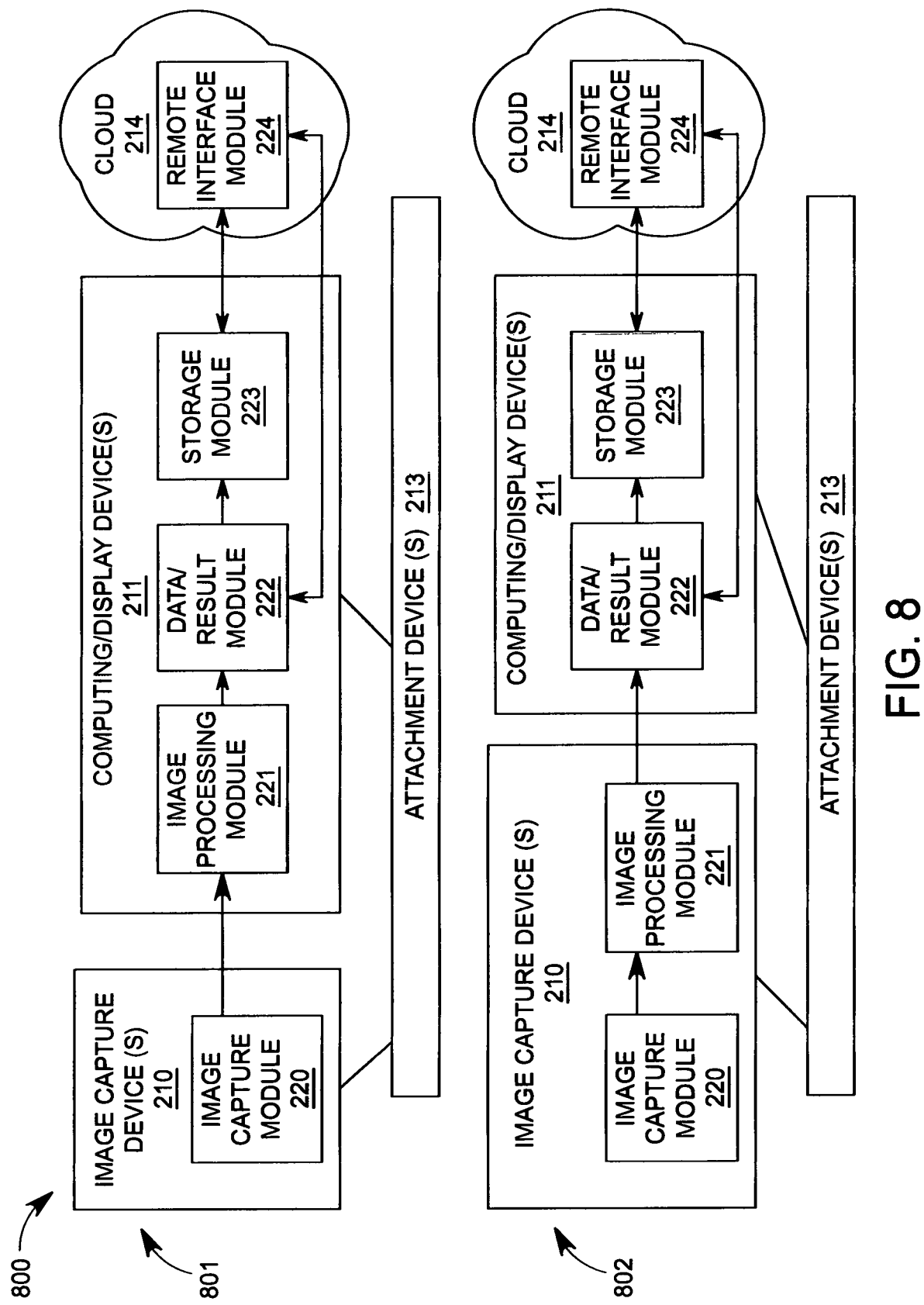
FIG. 8 is a diagram illustrating a few examples of the possible combinations of a hardware device(s) and software module(s) of the smart reader system referring to one solution.
Figure 8:
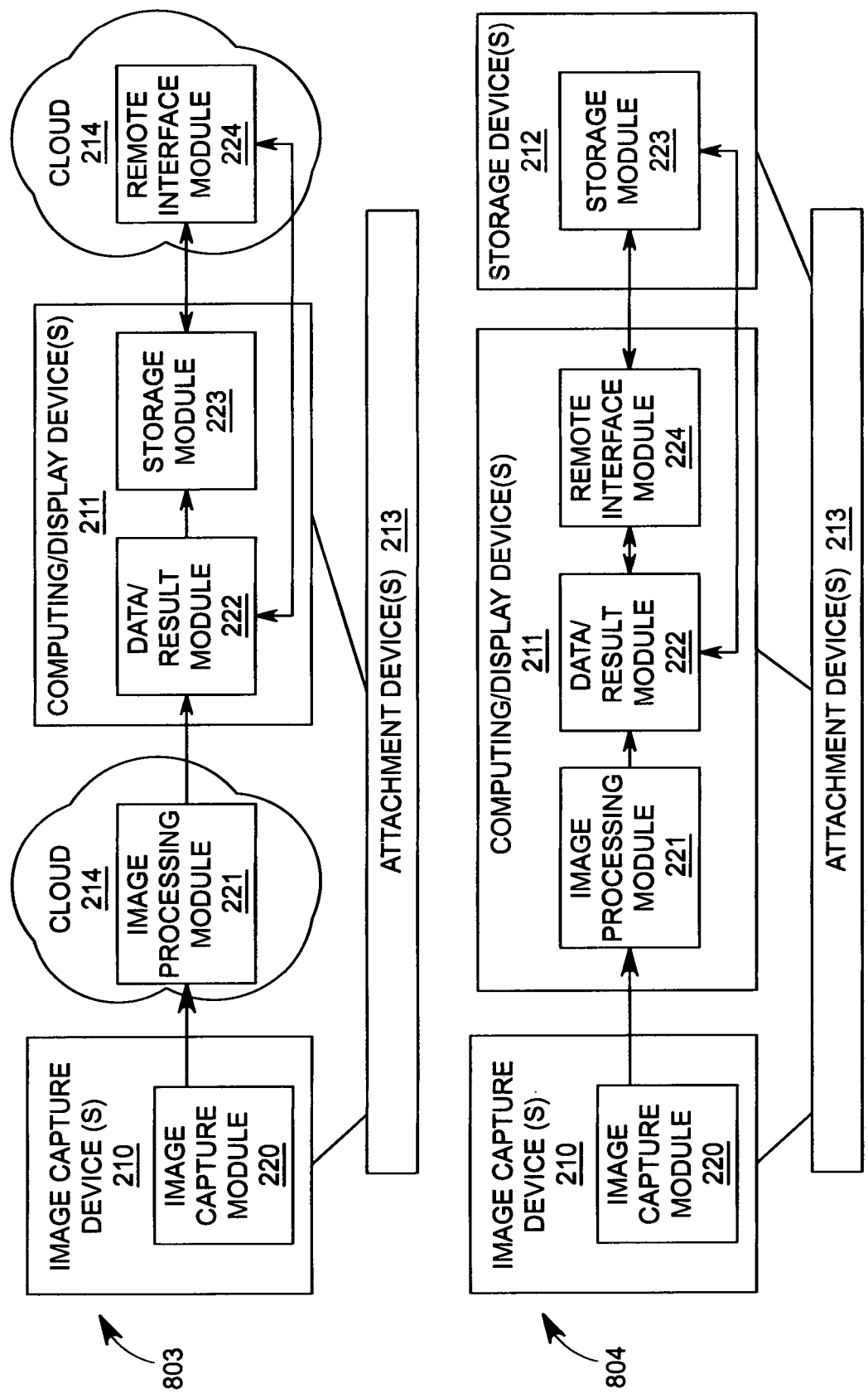

FIG. 8 is a diagram 800 illustrating a few examples of the possible combinations of the hardware device(s) 201 and the software module(s) 202 of the smart reader system 150 referring to FIG. 6. In this example embodiment, the image capture device(s) 210 is a camera 611, the computing/display device(s) 211 is a tablet 613, and the storage device(s) 212 may be a jump drive or may be a Micro SD card inserted inside the tablet which is not shown in the FIG. 6.

Referring to the example 801, the image capture module 220 may be hosted by the image capture device(s) 210. The image processing module 221, the data/result module 222, and the storage module 223 are hosted by a computing/display device(s) 211. And the remote interface module 224 is hosted by the cloud 214. The image capture device(s) 210 sends the data to the computing/display device(s) 211 by a USB cable. The computing/display device(s) 211 sends the data to the cloud 214 via the internet.

Referring to the example 802, the image capture module 220 and the image processing module 221 are hosted by the image capture device(s) 210. The data/result module 222 and the storage module 223 are hosted by a computing/display device(s) 211. And the remote interface module 224 is hosted by the cloud 214. The image capture device(s) 210 sends the data to the computing/display device(s) 211 by a USB cable. The computing/display device(s) 211 sends the data to the cloud 214 via the internet.

Referring to the example 803, the image capture module 220 is hosted by the image capture device(s) 210. The image processing module 221 is hosted by cloud 214. The data/result module 222 and the storage module 223 are hosted by a computing/display device(s) 211. And the remote interface module 224 is hosted by the cloud 214 as well. In this example, camera 611 may be an IP (Internet Protocol) camera that has the accessibility to the internet and send the data to the cloud 214 via the internet. The cloud 214 sends the data back to the computing/display device(s) 211 via the internet as well. And then, the computing/display device(s) 211 sends the data to the cloud via the internet.

Referring to the example 804, the image capture module 220 is hosted by the image capture device(s) 210. The image processing module 221, the data/result module 222, and the remote interface module 224 are hosted by a computing/display device(s) 211. The storage module 223 is hosted by a storage device(s) 212. In this example, the storage device(s) 212 may be a jump drive. The image capture device(s) 210 sends the data to the computing/display device(s) 211 by a USB cable. The computing/display device(s) 211 sends the data to the storage device(s) 212 by a USB adapter. And the computing/display device(s) 211 has the accessibility to the network that allows a user to communicate with the remote interface module 224 via the network. In some examples, the image capture device 210 may host the image capture module and he computing device 211 may host the image processing module. In some examples, the image capture device 210 may host both the image capture module and the image processing module.

Figure 9:
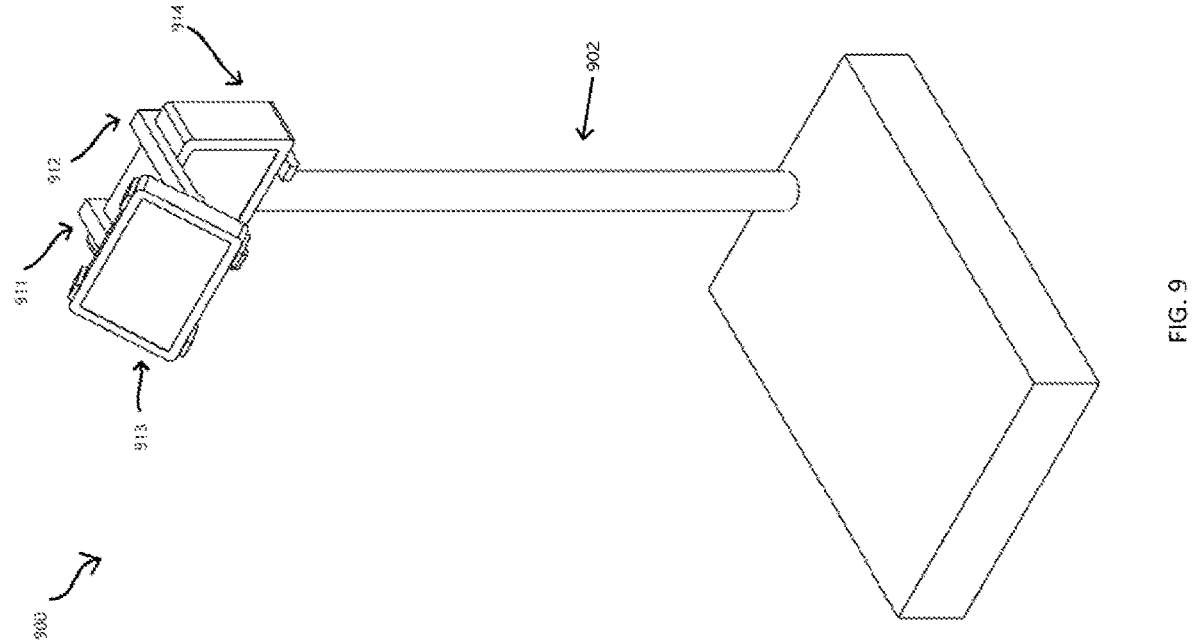
FIG. 9 is a diagram illustrating one of the possible solutions of the smart reader system.

FIG. 9 is a diagram 900 illustrating one of the possible solutions of the smart reader system 150. Referring to FIG. 9, by combining mainstream electronic scales 902, the present invention uses one or more universal brackets to fix the clamp one 911, clamp two 912, and tablet 913 on scale display 914. In this case, the camera may bean embedded camera contained in tablet 913. The AI/ML model reads the values on the scale through the camera in real-time. The AI/ML model accurately and efficiently identify the current weight, and finally a remote interface module may provide the re-read weight value to third-party applications. The remote interface module allows other applications to access the required data. In this case, the camera may be an embedded camera contained in tablet 913.

Figure 10:
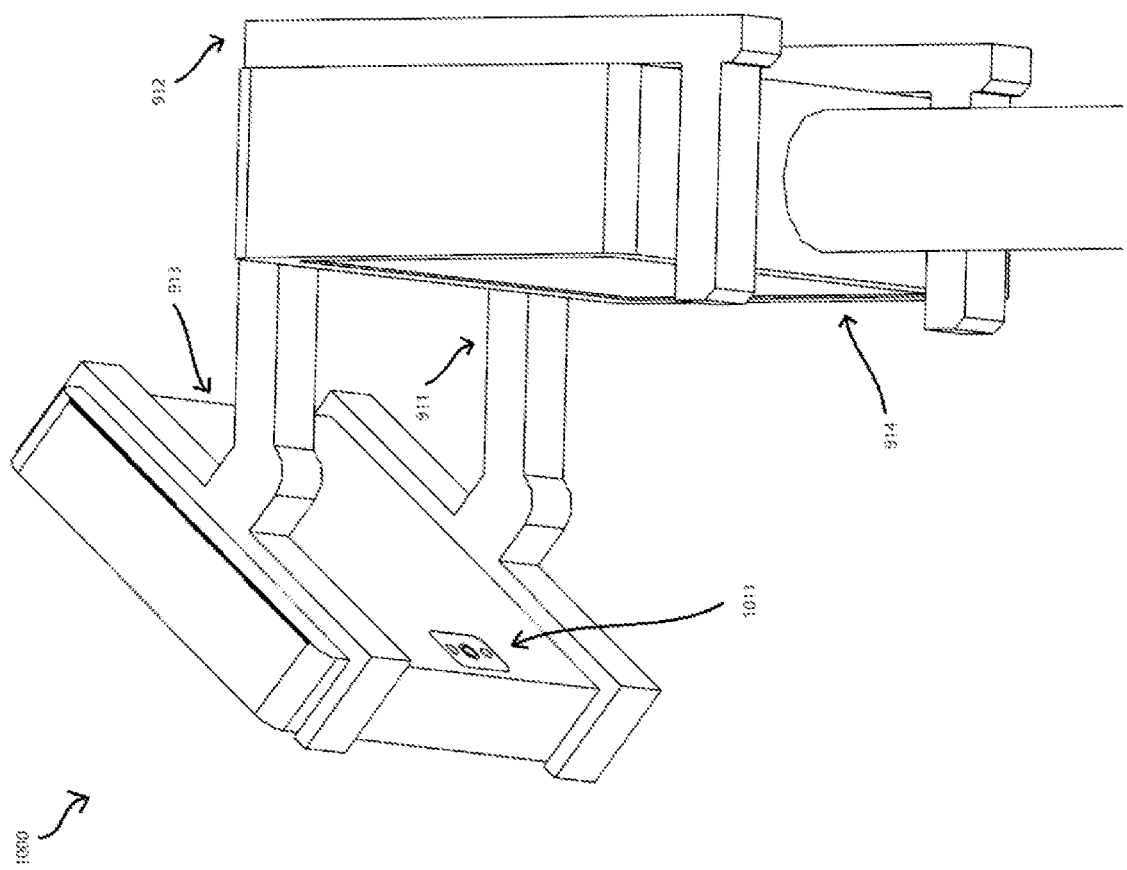
FIG. 10 is a close observation diagram of FIG. 9.

FIG. 10 is an enlarged bottom view of the smart reading system 1000, according to an embodiment. Referring to Figure FIG. 10, the clamp one 911 and the clamp two 912 has several different models in order to fix the different types of scales on the market. Tablet 913 is attached to the clamp one 911 and the clamp two 912. The tablet 913 contains an embedded camera 1011. The tablet 913 may be positioned such as an embedded camera 1011 can fully capture the full scale display 914, and clearly display the numbers under complex conditions, such as low light, strong light, and reflective conditions, as described above.

Figure 11:
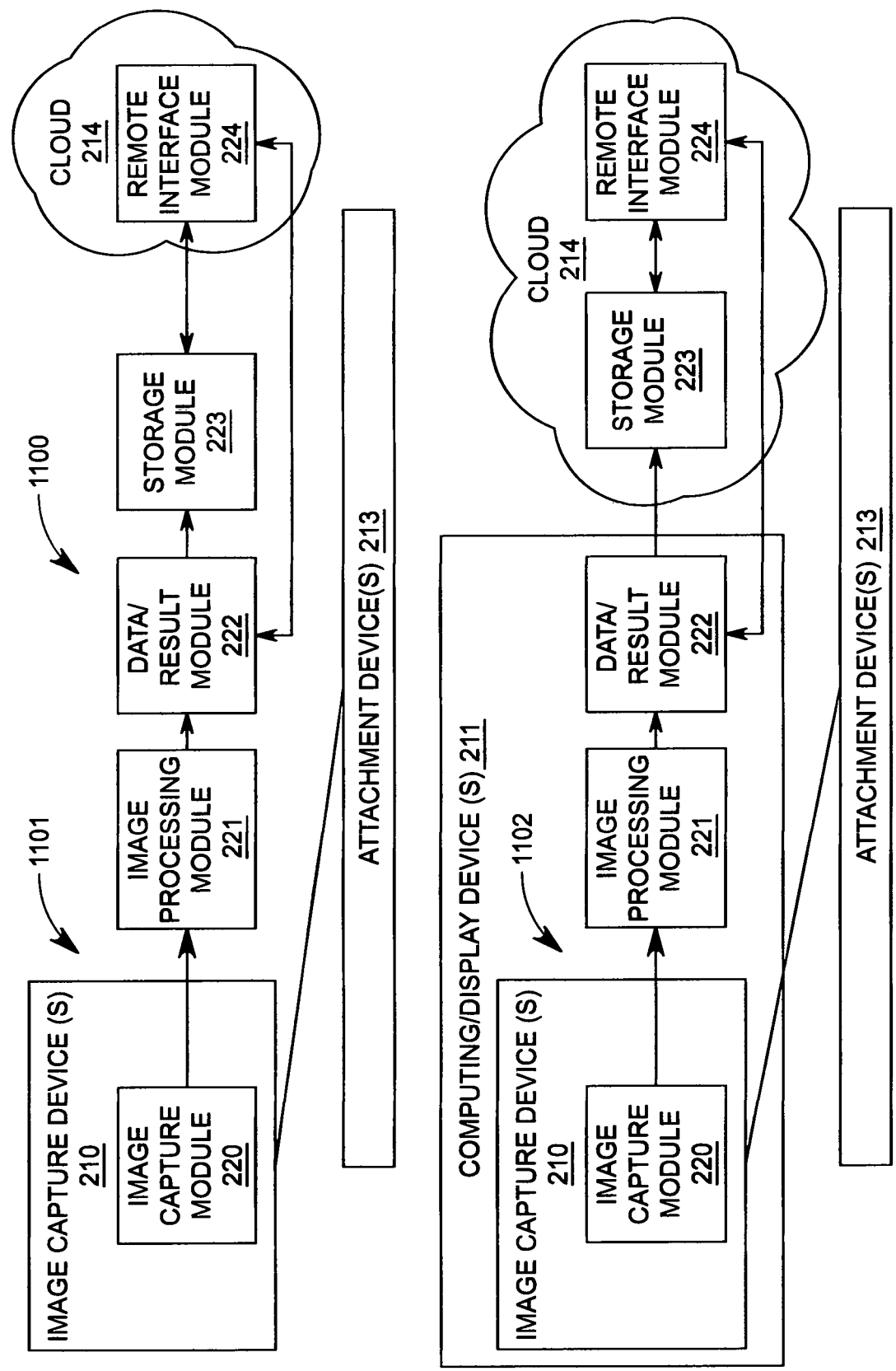
FIG. 11 is a diagram illustrating a few examples of the possible combinations of the hardware device(s) and the software module(s) of the smart reader system referring to one solution.
Figure 11:
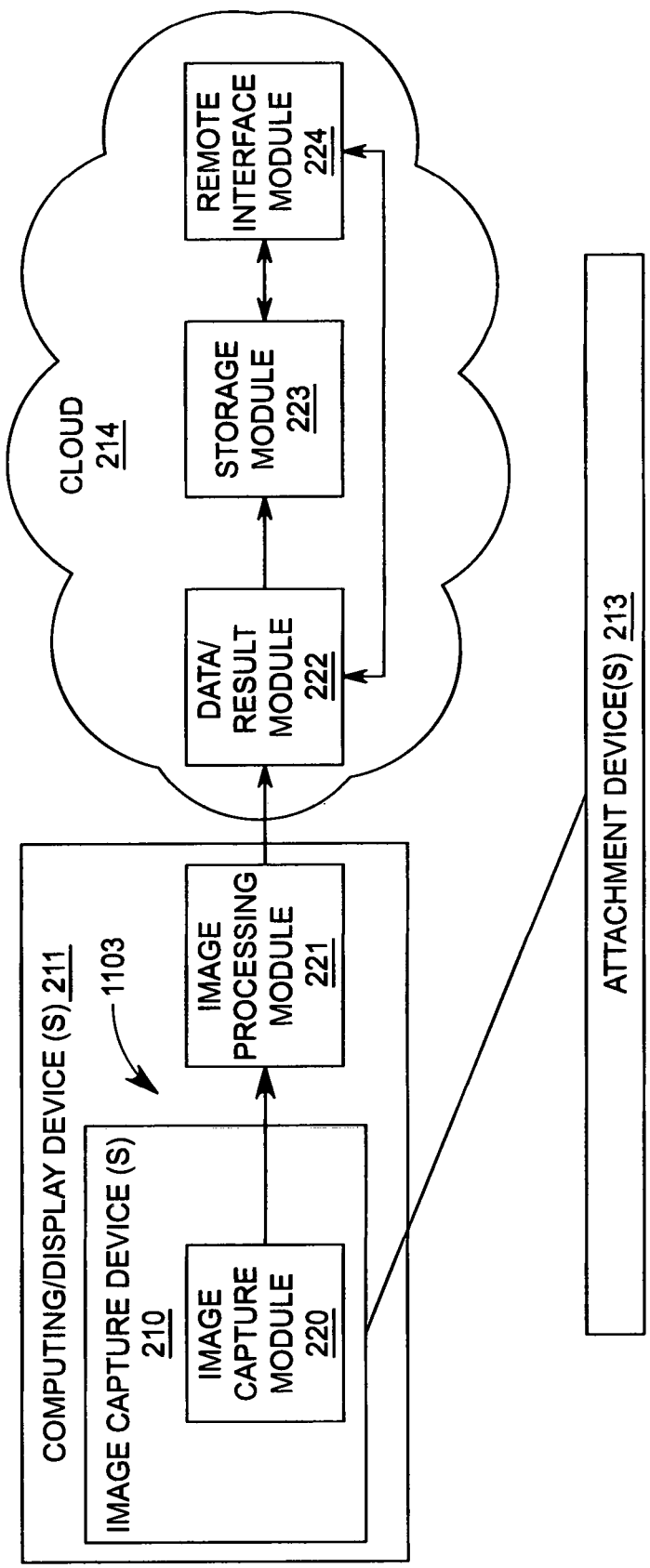

FIG. 11 are diagrams 1101, 1102, 1103 illustrating a few examples of the possible combinations of the hardware device(s) 201 and the software module(s) 202 of the smart reader system 150 referring to FIG. 9. In this example embodiment, the computing/display device(s) 211 is a tablet that contains a capture device(s) 210, which is a camera.

Referring to the example 1101, the image capture module 220, the image processing module 221, the data/result module 222, and the storage module 223 are hosted by a computing/display device(s) 211. And the remote interface module 224 is hosted by the cloud 214. The computing/display device(s) 211 sends the data to the cloud 214 via the internet.

Referring to the example 1102, the image capture module 220, the image processing module 221, and the data/result module 222 are hosted by a computing/display device(s) 211. The storage module 223 and the remote interface module 224 are hosted by the cloud. The computing/display device(s) 211 sends the data to the cloud 214 via the internet.

Figure 12:
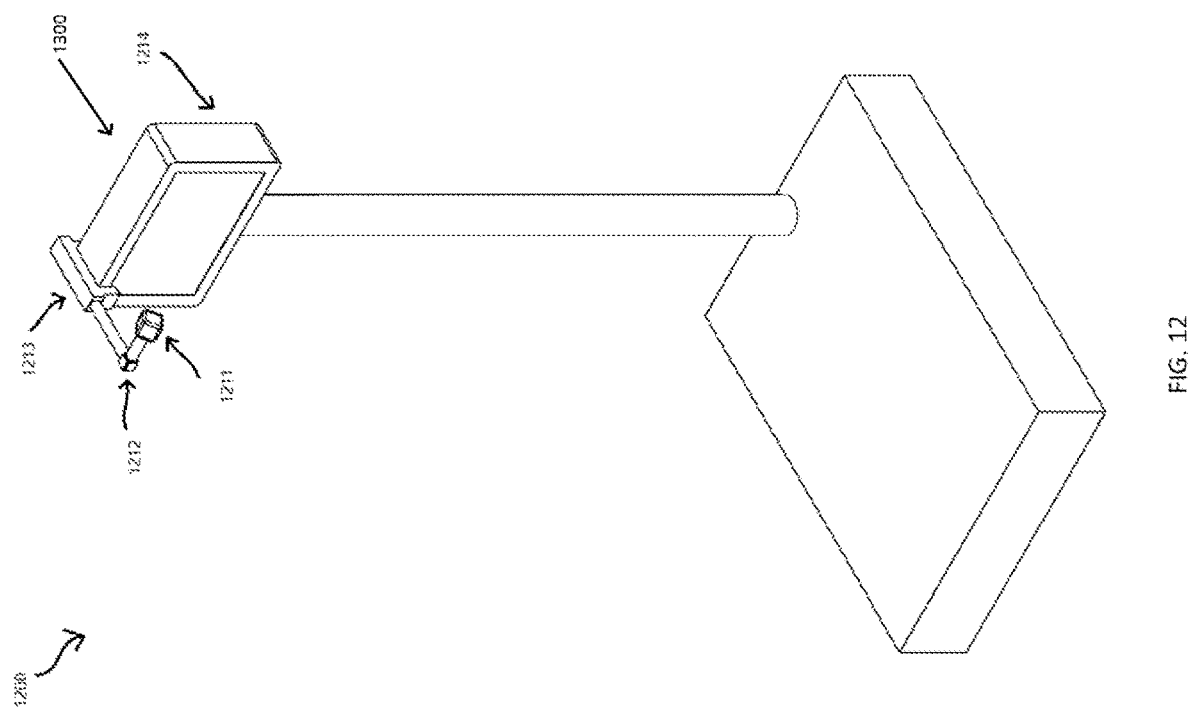
FIG. 12 is a diagram illustrating one of the possible solutions of the smart reader system.

Referring to the example 1103, the image capture module 220 and the image processing module 221 are hosted by a computing/display device(s) 211, the data/result module 222, the storage module 223, and the remote interface module 224 are hosted by the cloud. The computing/display device(s) 211 sends the data to the cloud 214 via the internet. In some examples, the computing device 211 may host all the software modules except the remote interface module, and the cloud host the remote interface module 224. The computing device 211 may host the image capture module 220, and the cloud may host all other modules. FIG. 12 illustrates an example of a smart scale system 1200. Referring to FIG. 12, by combining mainstream electronic scales on the market, the present invention uses one or more universal brackets to fix the IP camera 1211, adjustable arm 1212, and clamp 1213 on scale display 1214. The AI/ML model is configured to read the values on the scale through the camera in real-time. Accurately and efficiently identify the current weight, and finally the remote interface module may provide the re-read weight value to third-party applications. In this example embodiment, the camera is an IP camera, and the intelligent model may be hosted by the cloud. Since the camera is the IP camera, the scale reading is transmitted to a cloud server from the camera by using the internet.

Figure 13:
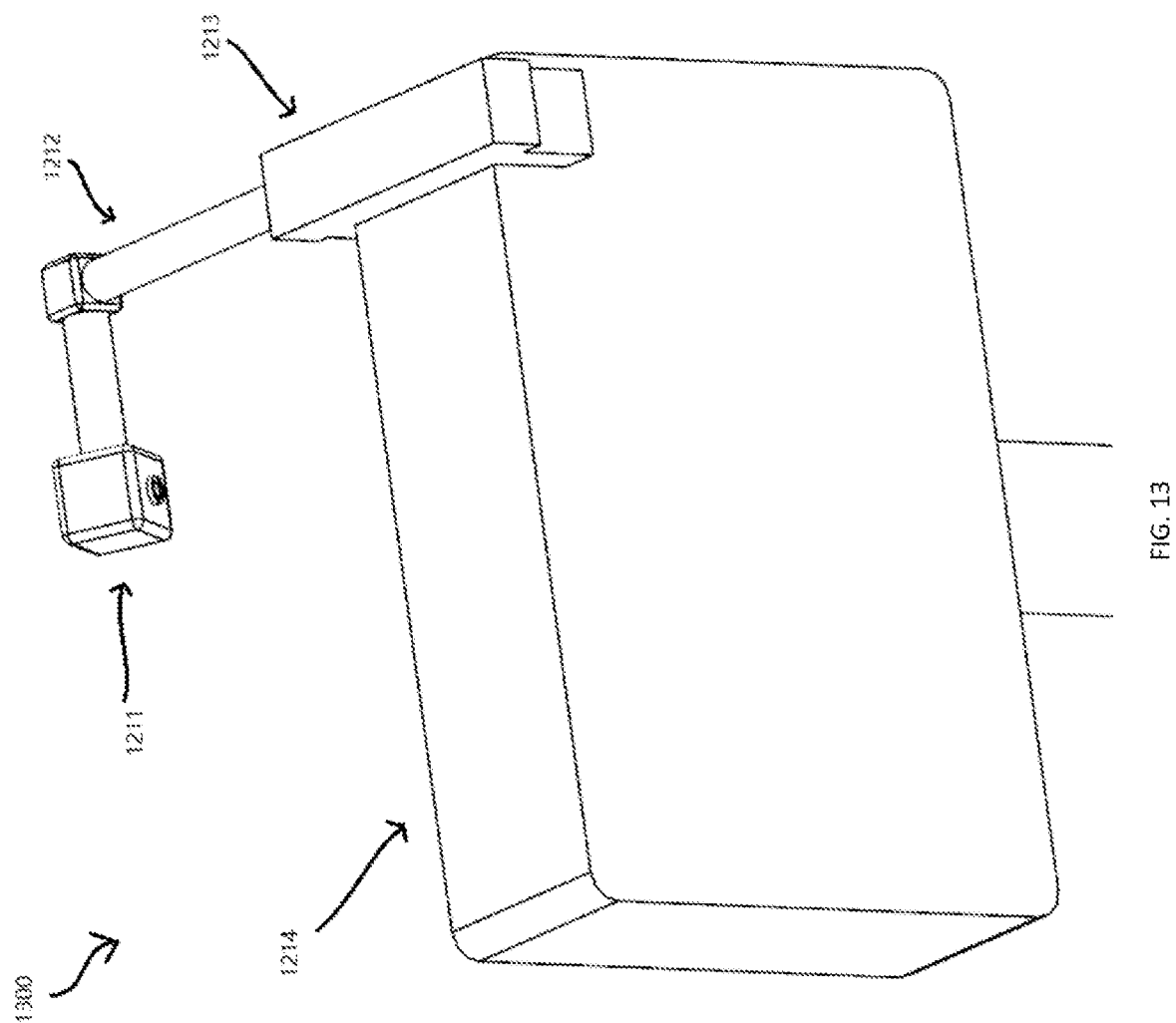
FIG. 13 is a close observation diagram of FIG. 12.

FIG. 13 is an enlarged view of a smart reading system 1300 of FIG. 12. Referring to Figure FIG. 13, clamp 1213 has several different models in order to fix the different types of scales on the market. The IP camera 1211 can fully capture the image of the scale display 1214 at its proper working position, and can clearly display the numbers under complex conditions, such as low light, strong light, and reflective conditions as described above. Adjustable arm 1212 can be used to adjust the relative position between the IP camera 1211 and the scale display 1214 to ensure the IP camera 1211 meets its proper working position. The IP camera 1211 may configure to communicate with a remote server via the IP protocol.

Figure 14:
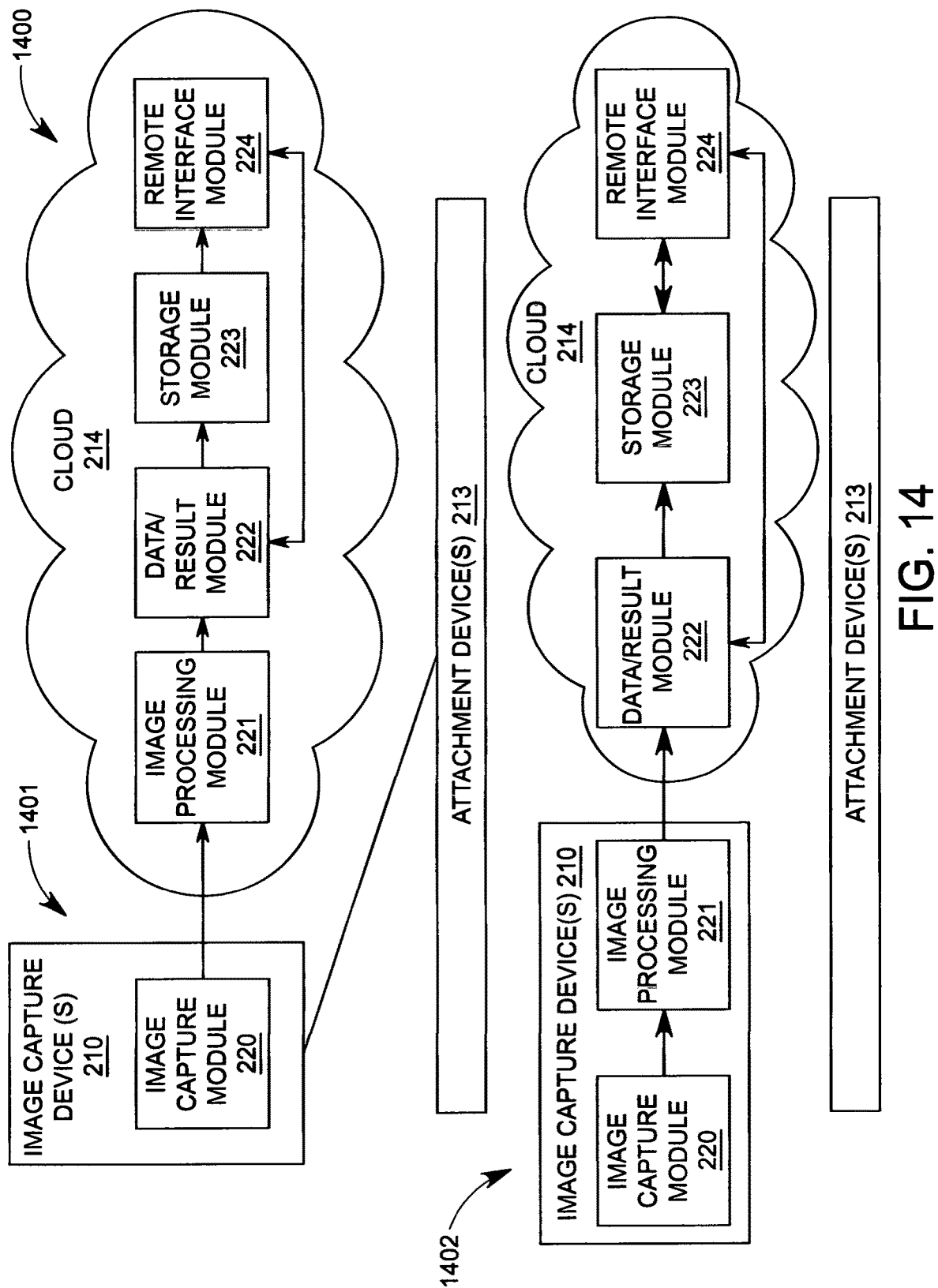
FIG. 14 is a diagram illustrating a few examples of the possible combinations of the hardware device(s) and the software module(s) of the smart reader system referring to one solution.

FIG. 14 is a diagram 1400 illustrating a few examples of the possible combinations of the hardware device(s) 201 and the software module(s) 202 of the smart reader system 150 referring to FIG. 12. In this example embodiment, the image capture device(s) 210 is an IP camera.

Referring to the example 1401, the image capture module 220 is hosted by an image capture device(s) 210. The image processing module 221, the data/result module 222, the storage module 223, and the remote interface module 224 are hosted by the cloud 214. The image capture device(s) 210 sends the data to the cloud 214 via the internet.

Referring to the example 1402, the image capture module 220 and the image processing module 221 are hosted by an image capture device(s) 210. The data/result module 222, the storage module 223, and the remote interface module 224 are hosted by the cloud 214. The image capture device(s) 210 sends the data to the cloud 214 via the internet.

Figure 15:
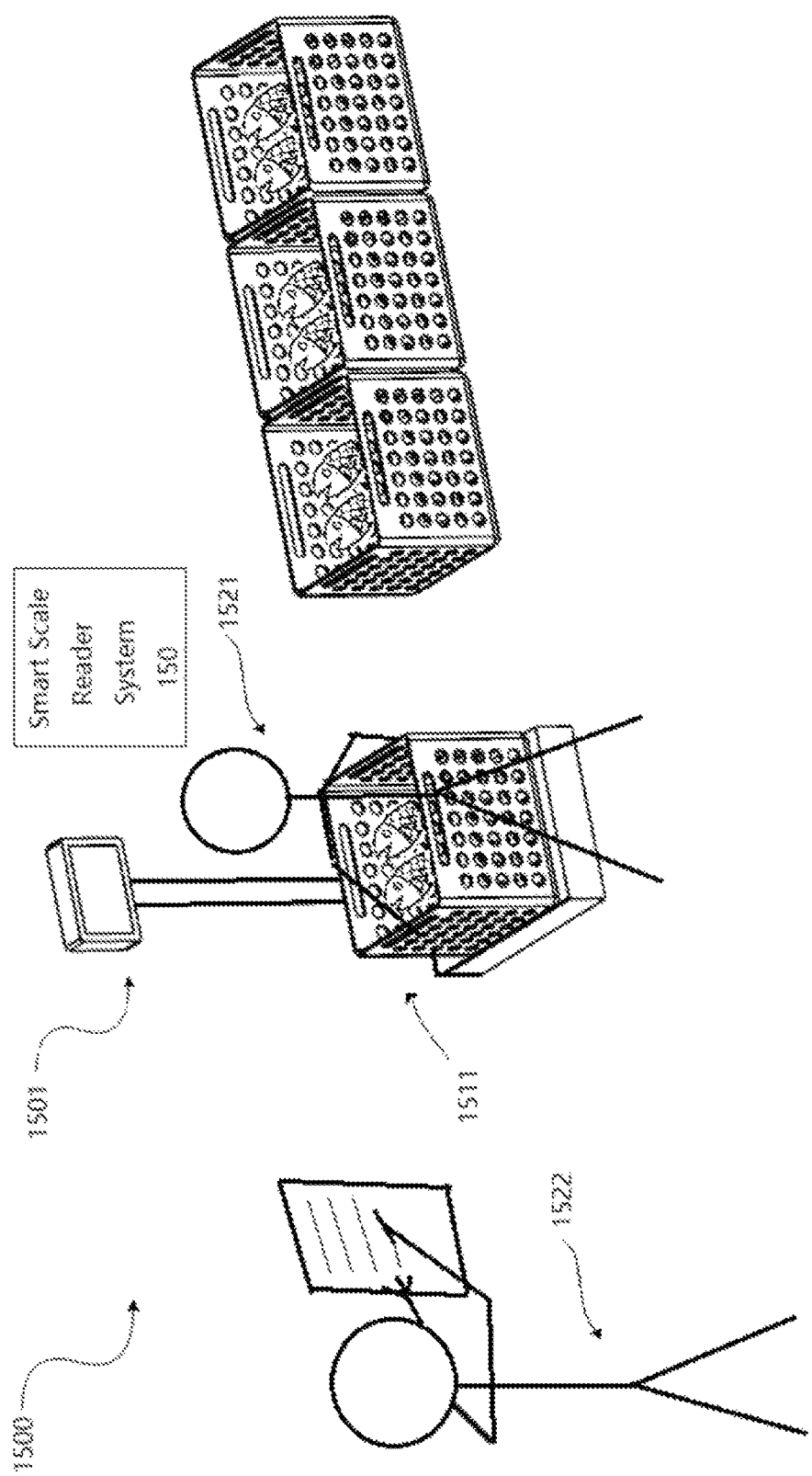
FIG. 15 is an illustration depicting one scenario, according to one example embodiment.

Although the present invention has been illustrated and described herein with reference to preferred embodiments and specific examples of the few possible combinations of the hardware device(s) 201 and the software module(s) 202 of the smart reader system 150, it should be understood that other embodiments and examples of other combinations may perform similar functions and/or achieve like results. All such equivalent embodiments and examples are within the spirit and scope of, and are contemplated by, the present disclosure. For example, the image capture device 210 may host all the software modules except the remote interface module 224, the cloud may host the remote interface module 224. The image capture device 210 may host only the image capture module 220, and the cloud host all other modules. FIG. 15 is an illustration depicting a scenario 1500 indicates one example embodiment of the smart reader system 150. The smart reader system 150 is placed in a dock, or on a fishing boat. A user 1521 may use a scale 1501 to weigh the baskets of fish. Traditionally, the user 1521 puts the fish basket 1511 on the scale 1501, reading the scale display and yield to person 1522 about the reading on the scale display. The user 1522 uses a pencil and a piece of paper to manually record the display reading. If the scale display is reflective or backlighting, the user 1521 may not see the scale display clearly. Typically, a additional recording person 1522 is needed to record the scale display reading. If the weather is windy, the recording person 1522 may not hear the user 1521 clearly. So, in this example embodiment, if the user 1521 uses the traditional way to weigh the baskets of fish, it is error-prone and quite manpower consuming, because the user 1521 may read the wrong number, the recording person 1522 may hear the wrong number. But if the smart reader system 150 is active, the person 1521 may put the fish basket on the scale, and the scale reader system 150 will complete weight reading and recording. After the weight reading shows up on the scale display, the smart reader system 150 will analyze the reading and automatically record the reading as described above. Person 1521 can directly move on for the next fish basket. Since the smart reader system 150 is not affected by complex conditions, such as low light, strong light, and reflective conditions. The problem that Person 1521 may read the wrong number is solved. Since the activation of the smart reader system 150 does not require an additional person 1522 to record the weight reading. The problem that the recording person 1522 may hear the wrong number is solved. As well, the smart reader system 150 saves one manpower which is the recording person 1522 in this case.

Figure 16:
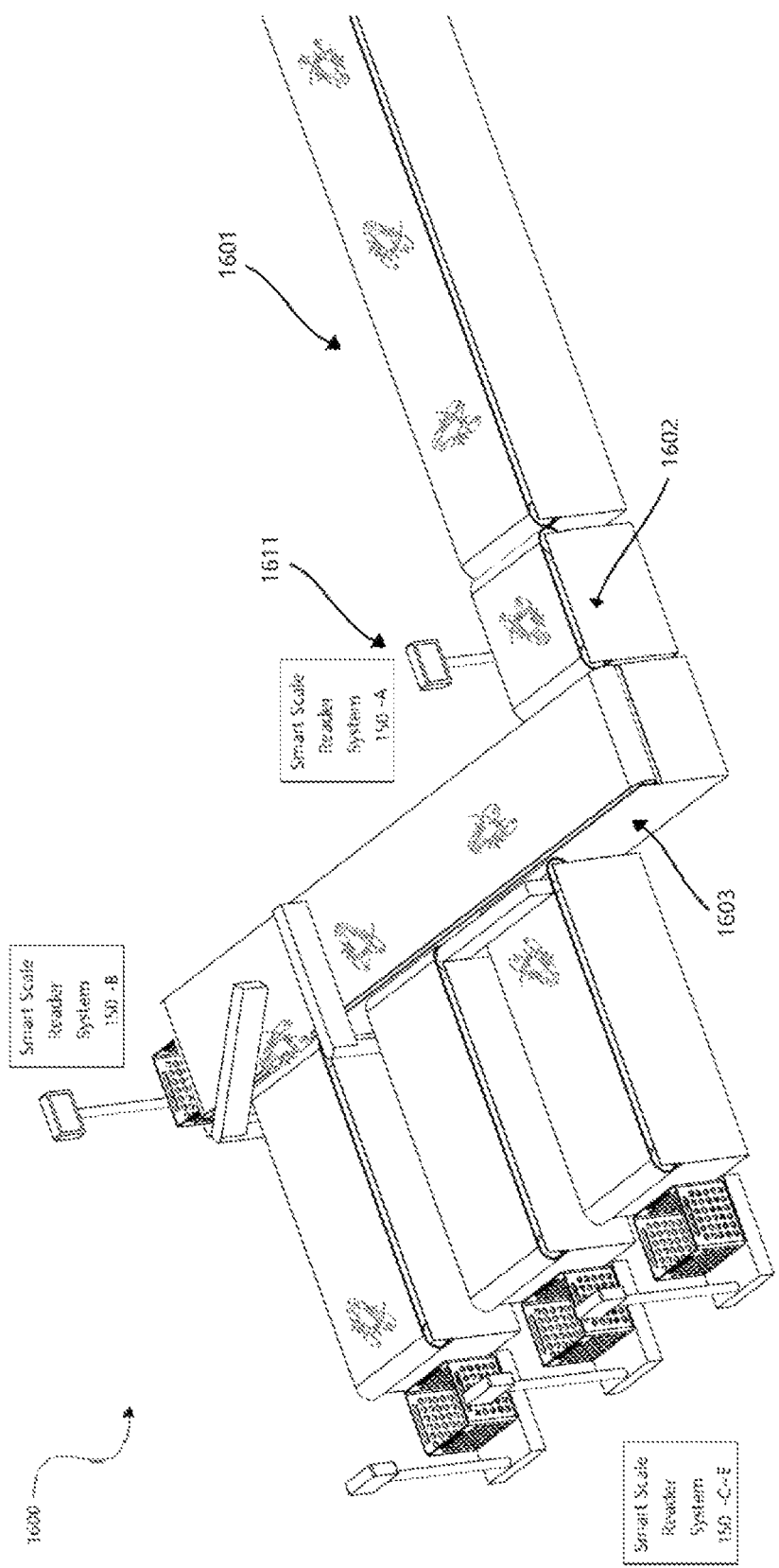
FIG. 16 is another illustrating depicting one scenario, according to one example embodiment.

FIG. 16 is an illustration depicting a scenario 1600 indicates another example embodiment shows how the smart reader system 150 cooperating with a third-party service or a third-party application, in this example embodiment, the smart reader system 150 is placed in an automated lobster division and boxing factory. The factory first needs to divide the lobster into four different types based on their weight, and then, put each type of the lobster into their corresponding boxes, the boxes also need to meet a certain amount of weight to ship. The conveyor belt 1601 keep sending the lobsters onto the scale 1611 incorporating the smart reading system. The scale 1611 weighs the lobsters and display each lobster's weight on its display. The smart reader system 150-A analyzes the scale display, and then, the remote interface module 224 may transmit the scale display reading to a third-party service. For example, the third-party program may send a request, such as an HTTP request, to the remote interface module 224 and establish a communication connection, and then the remote interface module 224 may keep sending the required data to the third-party program until the communication connection is interrupted. In this case, the third-party service may be a system that manages all the conveyor belts and the levers. And then, the third-party service controls the conveyor belt 1602 to send the lobster to the conveyor belt 1603. Based on the reading of the smart reader system 150-A, the third-party service controls the levers to split the lobsters into the four different spots, as shown in FIG. 16. The lobsters will drop from the conveyor belt to the bucket. The smart reader system 150-B and the smart reader system 150-C~E will keep tracking the scale display reading and send the scale display reading to the third-party service. When the bucket meets the required amount of weight, the third-party service alerts the worker to carry the current lobster bucket to another place and replace a new empty lobster bucket on the scale.

What is claimed is:

1. A smart reader system for a scale having a display, comprising: an image capture device for capturing an image of the display; and an attachment device for mounting on the scale, the attachment device configured to receive the image capture device; and a computing device configured to identify, using a first machine learning model, a weight from the image of the display, wherein the computing device is configured to, using the first machine learning model, to adjust a position of the image capture device by adjusting the attachment device, wherein the computing device is configured to determine, using a second machine learning model, a number in the image of the display, wherein if the display is not detected, the computing device is configured to, using the first machine learning model, prevent the identification of the weight from the image of the display, and wherein the second machine learning model is trained to execute a calculus method to calculate an average scale display reading for a time period to determine whether reading of the scale remains constant for a specific time period, or whether the reading varies in the specific time period, where if the reading remains constant for the specific time period, the computing device determines, using the second machine learning model, the number in the image of the display, and identifies, using the first machine learning model, the weight from the image of the display.

2. The system of claim 1, wherein the image capture device and the display are at a same level and have a distance of 5 cm-25 cm.

3. The system of claim 2, wherein the distance is 15 cm.

4. The system of claim 1, wherein the image capture device is configured to capture display at a specified portion of the image.

5. The system of any one of claim 1-3 or 4, wherein the attachment device comprises a clamp for securely mounted to the display, and an adjustable arm with a first end movably extended from the clamp, and a second end secured to the image capture device.

6. The system of any one of claim 1-3 or 4, wherein the attachment device comprises a first clamp for securely mounted to the display, and a second clamp for receiving the image capture device.

7. The system of any one of claim 1-3 or 4-6, further comprising a second display for displaying the weight identified by the computing device.

8. The system of claim 7, wherein the second display is a tablet display.

9. The system of claim 8, wherein the image capture device is at an opposite side of the tablet display.

10. The system of claim 8, wherein the computing device is a tablet.

11. The system of any one of claim 1-3 or 4-9, wherein the computing device is a cloud device or a remote device.

12. The system of any one of claim 1-3 or 4-10, further comprising a storage device for storing the image, the first machine learning model, the second machine learning model and the weight.

13. The system of any one of claim 1-3 or 4-6, wherein the image capture device is an IP camera.

14. The system of any one of claim 1-3 or 4-13, wherein the computing device is configured to determine variation of data on the display.

15. The system of claim 14, wherein the computing device is configured to average of the data on the display over a period of time.

16. The system of claim 15, wherein the computing device is further configured to aggregate data from multiple readings from the display.

17. The system of claim 16, wherein the computing device is configured to provide the aggregated data to a client device over a communications network.

18. The system of any one of claim 1-3 or 4-17, wherein the computing device is configured to provide a chart comprising multiple weights.

19. The system of claim 1, wherein the computing device is configured to convert the weight to a desired unit.

* * * * *